US006806808B1

(12) United States Patent
Watters et al.

(10) Patent No.: US 6,806,808 B1
(45) Date of Patent: Oct. 19, 2004

(54) WIRELESS EVENT-RECORDING DEVICE WITH IDENTIFICATION CODES

(75) Inventors: David G. Watters, Sunnyvale, CA (US); David L. Huestis, Menlo Park, CA (US); Alfred J. Bahr, Mountain View, CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 09/258,073

(22) Filed: Feb. 26, 1999

(51) Int. Cl.$^7$ ............................................... H04Q 5/22
(52) U.S. Cl. ..................... 340/10.41; 340/3.3
(58) Field of Search ........................... 340/10.41, 590, 340/541, 540, 3.3

(56) References Cited

U.S. PATENT DOCUMENTS

| | | | |
|---|---|---|---|
| 2,902,560 A | 9/1959 | Stanback et al. | |
| 3,098,136 A | 7/1963 | Stanback et al. | |
| 3,911,434 A | 10/1975 | Cook | 343/6.5 R |
| 4,213,292 A | 7/1980 | Dolezal et al. | |
| 4,500,213 A | 2/1985 | Grimm | |

(List continued on next page.)

FOREIGN PATENT DOCUMENTS

| | | |
|---|---|---|
| CH | 198991 | 9/1937 |
| CH | 610 178 G | 4/1979 |
| GB | 2308947 | 7/1997 |
| WO | WO94/27117 | 11/1994 |

OTHER PUBLICATIONS

Taub et al., Principle of Communication Systems, 1971, McGraw–Hill, 1 st. edition, pp. 227–228.*

C.L. Britton, Jr., et al., "MEMS Sensors and Wireless Telemetry for Distributed Systems", Mar. 1998, SPIE vol. 3328.

P. Neuzil, el al., "An Integrated Circuit to Operate a Transponder with Embeddable MEMS Microsensors for Structural Health Monitoring", 1997, Structual Health Monitoring, Session 1 pp. 492–501.

B. Westermo, et al., "A Peak Strain Sensor for Damage Assessment and Health Monitoring", 1997, Structual Health Monitoring, Session 1 pp. 515–526.

NASA Jet Propulsion Laboratory, "Automated Cargo–Tracking Transponders", Sep. 1998, NASA Tech Briefs.

(List continued on next page.)

Primary Examiner—Michael Horabik
Assistant Examiner—M Shimizu
(74) Attorney, Agent, or Firm—Beyer, Weaver & Thomas LLP

(57) ABSTRACT

A wireless recording device can be interrogated to determine its identity and its state. The state indicates whether a particular physical or chemical event has taken place. In effect, the physical or chemical event is recorded by the device. The identity of the device allows it to be distinguished from a number of similar devices. Thus the sensor device may be used in an array of devices that can be probed by a wireless interrogation unit. The device tells the interrogator who it is and what state it is in. The interrogator can thus easily identify particular items in an array that have reached a particular condition.

56 Claims, 10 Drawing Sheets

U.S. PATENT DOCUMENTS

| | | | |
|---|---|---|---|
| 4,616,199 A | | 10/1986 | Oster |
| 4,646,066 A | | 2/1987 | Baughman et al. ......... 340/540 |
| 4,762,426 A | | 8/1988 | Foss |
| 4,764,244 A | | 8/1988 | Chitty et al. |
| 4,891,255 A | | 1/1990 | Ciarlo ....................... 428/131 |
| 5,053,774 A | | 10/1991 | Schuermann et al. |
| 5,114,504 A | | 5/1992 | AbuJudom, II et al. |
| 5,211,129 A | | 5/1993 | Taylor et al. |
| 5,214,409 A | | 5/1993 | Beigel |
| 5,218,343 A | | 6/1993 | Stobbe et al. ............... 340/572 |
| 5,278,806 A | | 1/1994 | Affolter |
| 5,300,875 A | * | 4/1994 | Tuttle ......................... 320/138 |
| 5,446,452 A | * | 8/1995 | Litton .................. 340/870.17 |
| 5,448,220 A | | 9/1995 | Levy |
| 5,452,262 A | * | 9/1995 | Hagerty ......................... 367/6 |
| 5,461,385 A | * | 10/1995 | Armstrong ................... 342/42 |
| 5,481,262 A | | 1/1996 | Urbas et al. |
| 5,499,017 A | | 3/1996 | Beigel |
| 5,532,932 A | | 7/1996 | Niwa |
| 5,585,554 A | | 12/1996 | Handfield |
| 5,591,974 A | | 1/1997 | Troyer et al. |
| 5,680,106 A | | 10/1997 | Schrott et al. |
| 5,691,698 A | | 11/1997 | Scholl et al. |
| 5,712,609 A | | 1/1998 | Mehregany et al. |
| 5,717,135 A | | 2/1998 | Fiorletta et al. |
| 5,728,933 A | | 3/1998 | Schultz et al. |
| 5,745,039 A | | 4/1998 | Hof et al. |
| 5,745,049 A | * | 4/1998 | Akiyama et al. ...... 340/870.17 |
| 5,764,138 A | | 6/1998 | Lowe |
| 5,825,302 A | | 10/1998 | Stafford |
| 5,833,603 A | | 11/1998 | Kovacs ....................... 600/317 |
| 5,850,181 A | | 12/1998 | Heinrich et al. |
| 5,861,809 A | | 1/1999 | Eckstein et al. |
| 5,883,582 A | | 3/1999 | Bowers et al. |
| 5,946,179 A | | 8/1999 | Fleege et al. |
| 5,963,121 A | | 10/1999 | Stygar et al. |
| 5,966,066 A | | 10/1999 | Mehregany et al. |

OTHER PUBLICATIONS

Robert Puers, "Linking Sensors with Telemtry: Impact on the System Design", 1995, Transducers, Eurosensors IX, 4 A–1.

T. Akin, et al., "An Implantable Multichannel Digital Neural Recording System for a Micromachined Sieve Electrode", 1995, Transducers, Eurosensors IX, 5–A1.

Koenraad Van Schuylenbergh, et al., "Self Tuning Inductive Powering for Implatable Telemetric Monitoring Systems", 1995, Transducers, Eurosensors IX, 6 A–1.

Ciarlo, Dino R., "A latching accelerometer fabricated by the anisotropic etching of (110) oriented silicon wafers," *J. Micromech. Microeng. 2,* pp. 10–13, 1992.

Kovacs, Gregory T.A., *Micromachined Tranducers Sourcebook,* 1998.

Watters, David G., et al., Subsurface Microsensors for Automated Re–Certification of Thermal Protection Systems (SMARTPS): A Rapid Wireless Inspection Method, *SRI Project 2437,* Final Report, Sep. 1998.

Krantz, Donald, et al., Applied Research in Remotely–Queried Embedded Microsensors, *SPIE,* vol. 3328, Mar. 1998.

Abtech Scientific, Inc. "Interdigitated Microsensor Electrodes(IMEs)", website printout from www.abtechsci.com/imes.html, Last Revised Jul. 25, 2000, 4 pages.

Web pages from website www.shuttle.nasa.gov/shuttle/reference/sodb/2–5b.pdf, 2 pages.

Zhang, Yanwei, et al., "Thermally Actuated Microprobes for a New Wafer Probe Card," *IEEE Journal of Microelectromechanical Systems,* vol. 8, No. 1, Mar. 1999.

Goldman, Ken and Mehregany, Mehran, "A Novel Micromechanical Temperature Memory Sensor, " *Transducers 95—Eurosensor IX,* pp. 132–135.

Carr, William N., et al., "Integrated Pressure Sensor with Remote Power Source and Remote Readout," *Transducers 95—Eurosensor IX,* pp. 624–627.

Press Release, "World's First RFID Tagging IC with Sensor Input Targets Industrial Applications," Microchip, Microchip Website, http:\\www.microchip.com/10/edit/pRelease/pr120/index.htm.

MCRF202, "Passive RFID Device with Sensor Input," Microchip, *1999 Microchip Technology, Inc.,* pp.1–8.

Texas Instruments RFID Products–Document Center–S2000 Reference Manual, Series 2000 Reader System, Control Module Hardware, RI–CTL–MB2A, RI–CTL–MB6A, Jan. 1998.

* cited by examiner

WIRELESS EVENT-RECORDING DEVICE WITH IDENTIFICATION CODES

This invention was made with Government support under Contract Order Number A51960D awarded by NASA-Ames. The Government has certain rights in this invention.

BACKGROUND OF THE INVENTION

The present invention relates generally to sensor technology. More particularly, the present invention relates to wireless devices used to record the conditions of many items (e.g., thermal protection system tiles on a space vehicle).

In many sensing applications, it is desirable to determine whether an event has occurred. This event may include an over-limit such as surpassing a property threshold (i.e. a detrimental concentration of a bacteria in food) or may include a time integrated exposure, a material phase change or combination thereof which may form a history. In many applications, monitoring of the event as the event occurs may not be possible or practical, and thus it may be desirable to determine whether the event has occurred subsequent to occurrence. In addition, many applications require that many items be separately analyzed to determine whether the event has occurred for any of the items. Further, the remote nature of many sensor applications, such as a sensor placed within a sealed container, may demand a wireless form of communication that permits non-invasive interrogation.

The majority of current wireless monitoring systems provide real time response which may not be suitable or necessary in applications where a well defined event is being detected. For the case of detecting an infrequent event, continual real time information feedback for a large number of items may be inefficient. In addition, the complexity and size of real time sensors may make application in many environments unpractical.

Many sensing applications provide significant challenges due to inaccessible, environmentally prohibitive, or functionally disadvantageous conditions. Current device designs often cannot meet this need. Active sensors have been combined with various forms of wireless data communication, but these devices are generally large and require a battery or other subsequent power source. Further, the battery power source and/or attendant wiring may have a limited range of operation, thereby making the system fragile.

One particular example of the need for multiple event-recording devices for a large number of items is in developing faster methods for inspecting and maintaining the structural and functional integrity of reusable launch vehicles (RLVs), such as the Space Shuttle. One type of primary failure mode that can affect the Space Shuttle thermal protection system (TPS) tile performance is thermal breach. Thermal breach may be caused by hot gas penetration and over-temperature conditions at the TPS bond line during earth reentry, and results in the loss of gap fillers and/or the dimensional instability of the TPS. Thermal breach is difficult to detect since thermal penetration may damage the interior surface and/or the TPS bond line without clearly showing external indication of damage on the tile's top surface.

Current shuttle inspection techniques involve visual and manual inspection of each of the gaps between all of the nearly 22,000 tiles using a hand held filler gauge to measure the thickness and depth of spaces between the tiles. The inspection may further include looking for other effects of thermal stress such as surface damage, discoloration, silicon deposits, or texture changes of the TPS coating. Thermal protection tiles are bonded to a vehicle using an organic adhesive. If the organic adhesive (normally a shiny red) appears dull or black, a closer inspection is required to determine the extent of charring. Presently, Space Shuttle recertification for reflight requires tens of thousands of person hours to manually inspect each of the 22,000 shuttle tiles. The substantial cost of TPS inspection ranks second in operations costs only behind the propulsion system.

Not only is the current approach very slow and expensive, but human inspection is inherently error-prone. Repetitive inspection of the thousands of tiles leads to inspector fatigue and greater potential for error. The scaffolding required to inspect the vehicle is additionally costly and time consuming to set up. For the next generation of reusable launch vehicles (RLVs), it is desired to reduce turnaround time to 24 hours. As current detection methods are prohibitively time consuming and expensive, an automated means of post reentry inspection of the TPS is desirable.

One proposed approach to maintaining RLV systems involves the use of discreet active sensors which rely on a power source directly connected to the sensor. Examples of active sensors which have been used to discretely monitor RLV systems such as propulsion and guidance include strain gauges, thermocouples, and fiberoptic sensors. However, the size and complexity of the active sensors do not allow for monitoring of the TPS since the abundant number of tiles would necessitate a prohibitively excessive amount of weight and wiring.

In view of the foregoing, there are desired improved structures and techniques for wireless threshold sensing and recording for multiple objects.

SUMMARY OF THE INVENTION

The present invention provides a device that can be interrogated to determine its identity and its state. The state indicates whether a particular physical or chemical event has taken place. In effect, the device records the physical or chemical event. The identity of the device allows it to be distinguished from a number of similar devices. Thus this invention finds particular usefulness in the context of an array of devices that can be probed by a wireless interrogation unit. The device tells the interrogator who it is and what state it is in. The interrogator can thus easily identify particular items in an array that have reached a particular condition.

One aspect of the invention provides a device for reporting a physical or chemical event or state (possibly a time-integrated condition). The device may be characterized as including the following elements: (a) a sensor for detecting the physical or chemical event or state without using a power source; (b) a recording mechanism integral with or coupled to the sensor for recording that the physical or chemical event or state has occurred; (c) a tag that contains identification information that can distinguish the device from a plurality of similar devices; and (d) a transponder, coupled to the recording mechanism and the tag, configured to transmit a signal indicating the physical or chemical event or state and the identification information when triggered by a wireless interrogation signal.

In one specific example, the sensor is a temperature sensor and the physical or chemical event or state is exceeding a threshold temperature. A suitable device for this purpose may include a circuit as the recording mechanism and a fuse in the circuit as the sensor. When the threshold temperature is exceeded, the fuse opens at least one path through the circuit, thus changing the state of the recording mechanism. In one embodiment, opening the path changes the resonance frequency of the circuit. One way this can be detected is by probing the device with a swept- or stepped-frequency interrogation signal and detecting the peak frequency of the signal sent from the transponder.

To keep the device small and simple, it is preferably passive; that is, it does not include its own power source. Thus, the transponder component is preferably passive. In the example described, the radio frequency interrogation signal (or a separate energizing signal) may provide the transponder power. The sensor component and/or the recording mechanism are also preferably passive. In some cases, the physical or chemical event or state itself provides the power for the recording mechanism to record the event. For example, exceeding a threshold temperature melts a fuse in the above example.

Generally, the recording mechanism assumes a first state when the physical or chemical event or state has not been recorded and assumes a second state when the event or state has been recorded. Either state can be reported by the transponder in response to a wireless probe. Preferably, the recording mechanism can be reset after interrogation but cannot spontaneously return from the second state to the first state when the physical or chemical event or state ceases. Thus, when the temperature drops back below a threshold temperature (the physical event ceases), the recording mechanism will retain information that the device once exceeded the threshold.

The recording mechanism can take many different forms. It may be a mechanical structure, such as a latching structure, a microelectomechanical device, an integrated circuit memory device, an electrical circuit, an optical circuit, and the like. Likewise, the signal transmitted by the transponder may be provided on many different carriers. For example, the signal may be provided on an acoustic wave, a radio frequency wave, an electrical field, a magnetic field, a microwave frequency wave, a light wave, and the like. If the carrier is a wave of appropriate frequency, the transponder may include a modulator and an antenna.

To allow concurrent detection of multiple events or to allow more precise detection of a parameter value (e.g., temperature), a device of this invention may be designed with a plurality of recording mechanisms or sensors, each configured to record or detect a different physical or chemical event or state. The different physical or chemical events or states may be associated with different physical properties (parameters) such as temperature and strain. Alternatively, the different physical or chemical events or states may represent different thresholds of a single physical property. For example, the different thresholds of the single property may be two substantially different temperature thresholds. In this way, a maximum or minimum temperature may be precisely bracketed as determined by which of the sensors or recording mechanisms changed states.

In some embodiments, a single structure serves multiple purposes. For example, a resonant electrical circuit may serve as an antenna, a modulator, and a recording mechanism.

Another aspect of the invention provides a method for recording and reporting a physical or chemical event or state pertaining to a parameter being monitored using a wireless event recording device of the type described above, for example. The method includes passively recording the event using a recording mechanism included in the wireless event-recording device. The method further includes externally probing the wireless event-recording device using a wireless interrogator. The method also includes reporting a status of the recording mechanism and an identification of the individual wireless event-recording sensor.

Another aspect of the invention provides a collection of sensor (e.g., an array) including a plurality of spatially separated wireless event-recording devices each being distinguishable from the remaining wireless event-recording devices of the collection when probed by an interrogation signal. The individual devices may be identical to or similar to the devices described above. Thus, each wireless event-recording device may include a sensor for detecting the physical or chemical event or state, a recording mechanism for recording the event, and a transponder, coupled to the recording mechanism. Each of the individual devices is configured to transmit a signal indicating whether the event has been recorded when triggered by the interrogation signal. In a preferred embodiment, the plurality of event-recording devices are mounted at separate locations on a single structure.

Still another aspect of the invention relates to a wireless event sensing apparatus for recording and reporting an event pertaining to a physical parameter in a system being monitored. The apparatus includes one or more wireless event-recording devices in the system being monitored. The apparatus also includes an interrogator for externally probing the status of at least one wireless event-recording device subsequent to the event. A wireless signal from the interrogator may power the transponder of the wireless event-recording device. The interrogator then receives information on the state of the recording mechanism and the identification tag.

These and other features and advantages of the present invention will be described in the following description of the invention and associated figures.

DETAILED DESCRIPTION OF THE PREFERRED EMBODIMENTS

1. Overview

Figure 1:
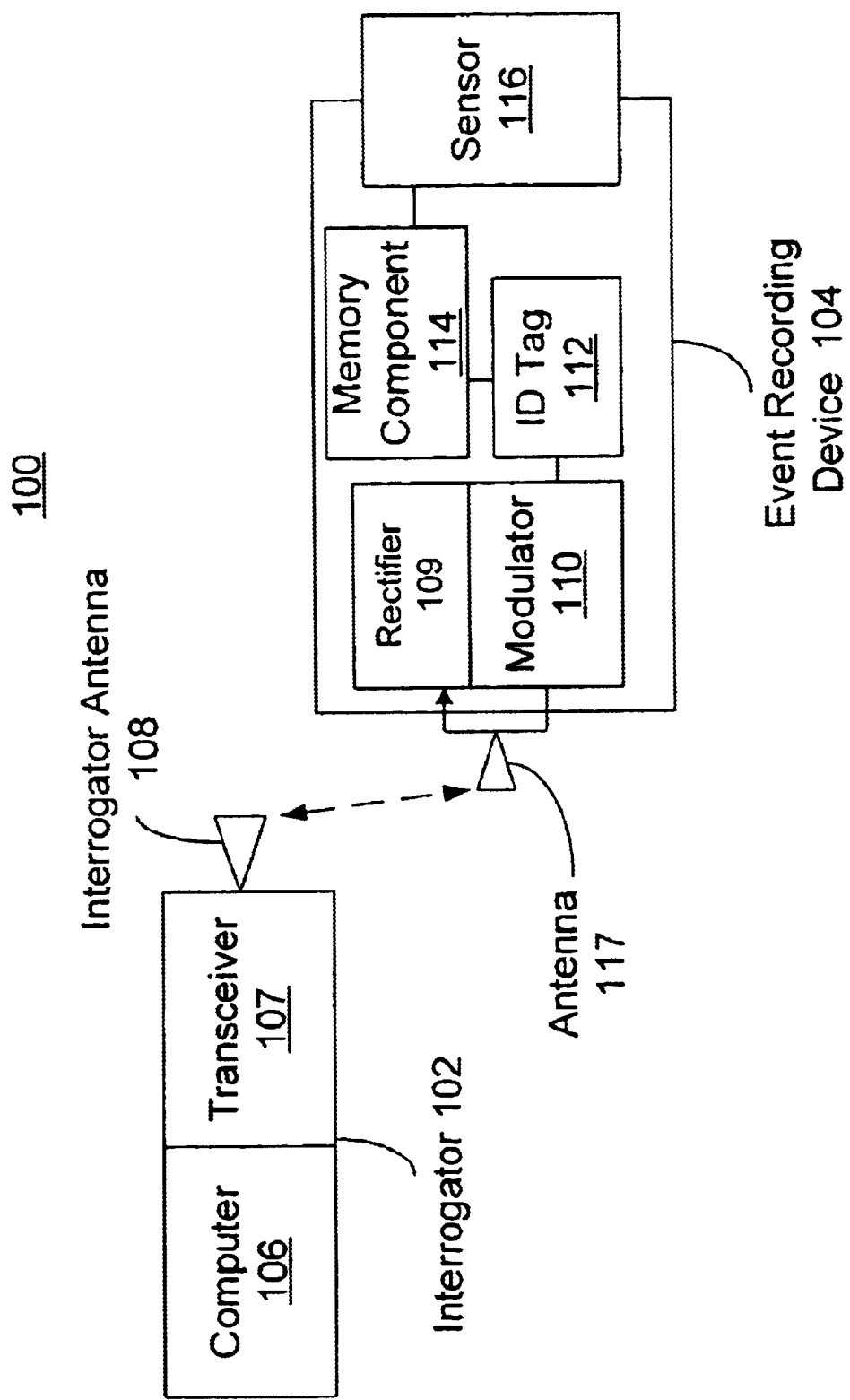
FIG. 1 shows a block diagram of a wireless event-recording device monitoring system, in accordance with one embodiment of the invention.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Generally, the methods and apparatus of this invention report physical or chemical events or states using easily implemented devices on systems where large numbers of points must be analyzed. These points may be separated spatially or temporally. Each such point is associated with a separate recording device of this invention. Together they may form a sensor array (spatial separation). Preferably, each recording device of such array has a unique identifier that permits it to provide a separate distinguishable reading while the entire array is probed. Within the recording sensor device, a sensor is coupled to some mechanism for recording a sensed event. The recording mechanism maintains an indication that the event occurred even after the event ceases to occur. For example, an over-temperature recording device should continue to indicate that a threshold temperature has been exceeded even after the temperature drops below the threshold.

Recording the event advantageously allows interrogation of the sensor at a time and/or place more practical or convenient than when/where the physical or chemical event took place. It also may eliminate the need for real time monitoring or continuous recording, thus eliminating the need for continuous power and data processing.

Generally, the recording devices of this invention detect a physical "event" associated with a "parameter." The parameter is usually a physical property of an item such as its temperature, density, strain, deformation, acceleration, pressure, mass, opacity, concentration, chemical state, hardness, conductivity, magnetization, dielectric constant, size, etc. The physical or chemical event that is sensed and recorded may be the attainment within the item of a particular value of the physical property. For example, the physical or chemical event may be reaching a particular threshold temperature within a material that bonds a thermal protection tile to a RLV. The event may also be a change of state such as a phase change in the item being sensed. Examples of phase changes include transformations between gas, liquid, and solid states, changes in morphology (e.g., crystalline state), magnetization, and the like. Examples of other state changes include a transition from an excited to a relaxed state, a charged to a non-charged state, an energy storage or discharge, or a digital change from a "1" to a "0" representing a physical process.

Note that the event to be detected could be a very fast or instantaneous event or one that requires a significant time to unfold. In this regard, a time-integrated exposure by the event-recording device will sometimes be appropriate. In this manner, detection of a new steady state condition along a continuum values can be detected and reported.

2. General Structure of Devices

FIG. 1 shows a wireless recording device system 100 of this invention. An interrogator 102 probes an individual event-or state-recording device 104 through wireless communication. Interrogator 102 may include any circuitry capable for performing this function. In this case, interrogator 102 includes a computer 106, a transceiver 107 and an interrogator antenna 108. In one embodiment of the invention, coupling between interrogator 102 and the individual event-recording device 104 is by radio frequency (RF) radiation.

Event-recording device 104 includes a rectifier 109, a modulator 110, an identification (ID) tag 112, a memory component 114, a sensor 116 and an antenna 117 (which together with modulator 110 serves as a wireless transponder). Sensor 116 is preferably, but not necessarily, a passive sensor, which records one or more specific physical or chemical events or states. In some cases, it may be viewed as being energized by the quantity being sensed (e.g., thermal energy provides the energy to record an over-temperature condition). Because applications in which the individual event-recording device 104 are implemented may vary considerably and may include environmentally prohibitive conditions, specific features of the sensor 116 may be governed by a particular application. Thus, the sensor 116 broadly refers to any sensor capable of detecting the intended physical or chemical event. For example, in a TPS monitoring system, all components of the event-recording device such as the sensor 116 would be expected to survive temperatures near 200 degrees Celsius.

Memory component 114 allows for recording of the event detected by the sensor 116 and subsequent reading by interrogator 102. Memory component 114 is preferably "unidirectional" with respect to the sensor such that once the event has occurred, and the memory component 114 has been altered, the sensor and quantity being sensed are solely unable to further alter the memory component 114. More specifically, the sensor or quantity being measured is unable to drive the memory component 114 back to its original state after the event. However, as will be described in further detail below, memory component 114 may be resetable by other means including manual reset and RF induced reset.

When probed by interrogator 102, event-recording device 104 replies with its ID (from identification tag 112) and information contained in memory component 114. The information from memory 114 should indicate whether the physical or chemical event of interest has occurred. This information is read out along with the device's identification code. The ID code provides a means for automatically logging the data entry corresponding to the status of each device in a group of devices.

In some preferred embodiments, the interrogator provides power to the event-recording device. The power is transmitted by RF waves, for example. Rectifier 109 of the transponder rectifies the signal, thereby providing sufficient DC voltage to operate any digital circuitry of the device.

Note that a single structure or mechanism can serve as two or more of the components in event-recording device 104. For example, a resonant electrical circuit can serve as both modulator 110 and antenna 117. Further, a single circuit can serve as both memory 114 and some or all of the transponder. For example, some recording devices use backscatter modulation to respond to the interrogator. One way to accomplish this backscatter modulation is to vary the load impedance of a resonant circuit. The circuit that performs this function (of varying the impedance) may be described as modulator and the memory.

The example of FIG. 1 assumes that the wireless communication takes place via electromagnetic radiation of appropriate frequency. Thus, an antenna is required. Generally, however, the interrogator and recording device may be designed to allow any suitable probe signal or carrier (not just RF or other electromagnetic radiation). The carrier should allow the device to be probed from a substantial distance and over a wide area. It should also be able to power the transmission of data from the sensing device to the interrogator. The carrier should also provide sufficient bandwidth to transfer the desired information in a timely manner. Additionally, the modulated carrier may also be sufficiently unique, in terms of frequency or time synchronization, or coding, such that it is distinguishable from the signal provided by nearby event-recording devices. Generally, the carrier may be a wave or field or other intangible effector that acts over a distance through a medium (vacuum, gas, fluid, solid, etc.) between the interrogator and the recording device. Examples of suitable carriers include RF radiation, microwave radiation, visible, ultraviolet, and infrared radiation, acoustic waves, electric fields, magnetic fields, and the like. If the system employs RF radiation, the frequency preferably ranges between 125 kHz and 5800 MHz and is provided at a power of between about 7 and 2 Watts, respectively (as specified by the IEEE). In a specific embodiment, the interrogator may operate at an approved frequency at or near that used for an available RFID device; e.g., near 125 kHz in one case and about 13 MHz in another case. Microwave radiation provides another preferred carrier. Generally, it provides the same functionality as RF radiation, but at larger read ranges. Typically, any approved or regulated band such as the ISM bands at 945 MHz, 5.8 GHz and 2.45 GHz may be used.

3. Sensors

In general, a variety of sensors may be used in the recording devices of this invention. The sensor chosen for a particular application should be able to detect the physical or chemical event under consideration. Thus, the sensor should detect a change in the parameter associated with the physical or chemical event. A temperature sensor should be used to detect whether the bonding material of a TPS tile of an RLV reached an over-temperature condition. Further, the sensor should have a dynamic range that covers the physical or chemical event in question. And, each time a specified physical or chemical event occurs, the sensor should trigger a change in the associated recording mechanism. The sensor should also be able to withstand the operating conditions to which it will be exposed and fit within good design practices including reliability, accuracy, size, weight, safety, and compatibility with other components and the application.

Conventionally, most sensors are stand-alone, directly powered devices that provide real time measurements of the quantity being sensed. For many applications important to this invention, such conventional active sensors are not suitable because the required power may make them unduly complex and large. For example, powered devices often require their own battery or wiring to a central power source. Further, many applications suitable for the recording devices of this invention require detection of only one or a few physical or chemical events or states. Thus, they do not require continuous monitoring of or reporting on the parameter of interest. Preferably, sensor 116 of event-recording device 104 is a small device responsible for detecting an event as opposed to real time feedback.

Most any type of sensor may be used with this invention, so long as it meets the functional requirements. Sensors may be classified based upon the parameters that they sense and the transduction mechanisms they employ. Very many sensor types are known and used for different applications.

Many examples of things to be sensed and sensing mechanisms are described by Julian W. Gardner in "Microsensors: Principles and Applications," John Wiley, 1994 (incorporated herein by reference in its entirety and for all purposes). Among the listed items are (1) thermal sensors: temperature, heat, heat flow, entropy, heat capacity; radiation sensors: gamma rays, X-rays, UV, visible, IR, microwaves, radio waves; mechanical sensors: displacement, velocity, acceleration, force, torque, pressure, mass, flow, acoustic wavelength, amplitude; magnetic sensors: magnetic field, flux, magnetic moment, magnetization, magnetic permeability; chemical sensors: humidity, pH level and ions, concentration of gases, vapours and odors, toxic and flammable materials, pollutants; biological ensors: sugars, proteins, hormones, antigens; electrical sensors: charge, current, voltage, resistance, conductance, capacitance, inductance, dielectric permittivity, polarization, frequency, and the like.

A transduction mechanism is usually needed to convert the sensed quantity into an electrical signal. Suitable transduction examples include conductometric (changes in resistance or conductivity), potentiometric, capacitive, amperometric, calorimetric, optical, resonant, fluorescent, piezo-electric, optoelectric, magnetooptic, surface-acoustic wave, thermoelectric, magnetoresistive, superconductive, and other effects.

Just for temperature sensors, many different sensing mechanisms may be employed. Constitutive parameters that change with temperature include (but not all inclusive) physical size and shape (e.g. linear coefficient of thermal expansion), resistance, capacitance (permittivity), permeability (inductance), electron or hole mobility, carrier concentration (semiconductor device), density, mechanical properties, such as elastic modules, velocity of sound, magnetostricture properties, non-linear thermal effects, thermoelectric effects, piezoelectric effects, melting point, opacity, (reflectance, transmittance, polarization, emissivity, IR) and so on. These effects can be transduced by changing or generating a DC, AC, or RF electric current, electric, voltages, by changing or generating an acoustic/optical/infrared/X-ray signal, etc. Preferably, the sensing mechanism is an unpowered, passive device that will store or release energy from a memory device that is polled later on. This state change or energy change could be reversible or non-reversible. For example, something that expands with temperature should be connected to a device that latches at the temperature of interest. The latching device may change the properties of a circuit that is interrogated later on. The latch could be reset mechanically, electrostatically, electromagnetically, and by other means for automatic reset.

Specific sensors that may be used in preferred embodiments of this invention include temperature sensors, pressure sensors, flow sensors, stress/strain sensors, accelerometers, dielectric sensors, conductivity sensors, sensors that detect or measure chemical or biochemical species, shock sensors, vibration sensors, sensors that detect thermal exposure, optical exposure, x-ray exposure, microwave exposure, pollutants, particle size, alignment, and the like. Many sensors suitable for this invention are commercially available.

More specific examples of sensors for use with this invention include silicon-based pressure transducers for over stress sensing (in either fused or resetable designs), capacitive bridges for distinguishing between uncharred, charred and brittle-charred filler in the TPS application, acoustic sensors for detecting embrittlement by detecting differential levels of elastic modulus and acoustic propagation characteristics, microwave bridges for detecting moisture content or the presence of a waterproofing solvent (ethanol for example), fuses for detecting threshold temperatures, etc

4. Memory Component

As indicated above, the event-recording devices of this invention include some form of recording mechanism coupled to the sensor. Most conventional sensor systems work on a real time basis and do not store information. If the information is stored at all, it is done on system external to the sensing device itself. For many important applications, it is not necessary to have real time monitoring of a parameter. All that is required is that the some physical or chemical event associated with the parameter be recorded. Further, for many applications, real time monitoring would require a prohibitively complex or fragile system. For example, when an RLV reenters the earth's atmosphere, the extremely aggressive conditions would destroy a typical real time monitoring system.

Generally, the memory device should record the physical or chemical event when the sensor provides an indication that the event has occurred. "Recording" usually means that the mechanism has changed. For example, the recording mechanism's resonance frequency changes or the spatial location of a beam changes, or a digital value in a memory location changes, etc. The state change should not spontaneously reverse. Thus, when the physical or chemical event triggers a change from state 1 to state 2, the recording mechanism should remain in state 2 even after the physical or chemical event ceases. Further, the recording mechanism should cause a sufficient change in the operation of the device to be detectable by the chosen interrogation means. In the case of a resonant circuit, for example, the frequency shift recording the event needs to be measurable. Generally, the recording resonant circuit needs to change frequency by an amount greater than the width of the resonance (quality factor Q).

Examples of recording mechanisms include electrical circuits, electromechanical circuits, mechanical latching mechanisms, programmable integrated circuits such as EPROMs, fusible links, magnetic circuits, acoustic circuits, optical/IR circuits, and the like. In an acoustic circuit, impedance and resonance can change to record an event. In an optical circuit, a path length, reflectivity, etc. can change to record the event.

Often it will be convenient to integrate the recording mechanism and sensor in a single device such as a circuit or mechanical device. For example, the recording mechanism may be an electrical circuit having a particular resonance frequency and the sensor may be a fuse in one leg of the circuit. A few specific examples of such combinations will be discussed below with reference to FIGS. 3, 4A, and 4B.

In some embodiments of the present invention, the memory component includes multiple recording mechanisms or sensors, all able to record different physical or chemical events or states. The different physical events may all pertain to the same parameter such as temperature. For example, an over-temperature detection system may allow include three separate recording components and/or sensors, each configured to record a separate threshold temperature: e.g., 200, 250 and 275 degrees Celsius. In another embodiment, memory component and/or sensor is configured to sense different parameters. For example, in a food processing application, a pressure sensor for measuring container pressure is used along with a chemical sensor sensitive to a particular bacteria concentration, both of which are independently coupled to a memory component, which is capable of recording separate events for each sensor.

5. Device Identifiers

As indicated in the discussion of FIG. 1, event-recording devices of this invention preferably include an identifier tag (reference number 112). Generally, a wireless probe of the sensor device should return a value or other source indicator provided by the ID tag. That value preferably uniquely identifies the particular device providing the report. This allows it to be distinguished from a number or other devices as would be encountered in an array of devices on a system. Preferably, the identifier tags are small devices that contain an identification (ID) code that can be read remotely using the interrogator. In the case of an array of sensors—each associated with a separate item in a system under test—the idea is to sense and store a parameter of interest, such as whether the temperature under a tile exceeded a threshold value during re-entry, and then read it out along with the device's identification code during a subsequent analysis (e.g., a post-flight inspection). The ID code provides a means of automatically logging the data entry corresponding to the status of each ID tag and corresponding item (e.g., a RLV tile).

Various types of identifier tags are known in the art and may be used with this invention. Examples of ID tags include microchips storing the ID code (e.g., an EPROM), magnetic recording devices, surface acoustic wave devices, electrical circuits providing a plurality of resonant circuits, optical bar codes, and the like.

Some identifier tag/interrogation systems are designed to be polled one at a time (serially), while other interrogators are able to poll multiple tags simultaneously. Communications strategies typically make use of anti-collision and arbitration procedures that control the time when a tag responds to a probe.

Wireless ID tags are commercially well known and there exists numerous manufacturers that currently offer a wide selection of RFID tags. These tags are either passive (typically operating near 125 kHz) or active (often operating near 2.45 GHz). Major manufacturers include Texas Instruments of Dallas, Tex., Micron Communications of Boise, Id., and Motorola of San Jose, Calif. Products are available for inventory control, pet identification, product labeling, etc. For example, event-recording device 204 may use a commercial RFID tag, such as the 125-kHz Destron-Fearing tag, supplied by Biomark, Inc. of Boise Id., which includes a microchip and a ferrite-loaded inductor with a resonating capacitor on a PC board, all in a glass-encapsulated enclosure. Preferably, the invention utilizes an RF technology, such as one that is commercially available. Some of these products are designed to withstand high temperatures (e.g., up to 200° C.) for short periods of time (Motorola's Indala tags, for example). Such robust identifier tags may be useful in aggressive environments such as those encountered by a RLV during reentry.

Figure 2A:
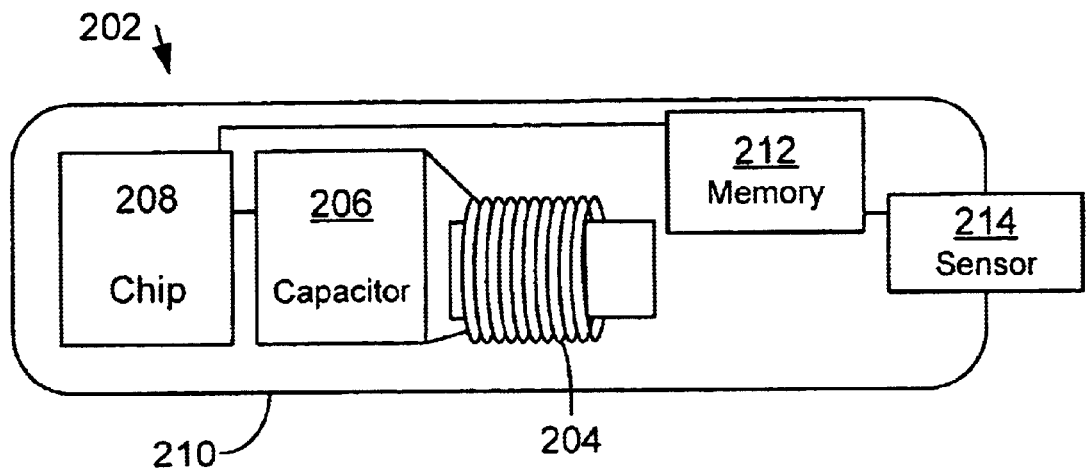
FIG. 2A illustrates typical components of a low-frequency RFID tag used in a recording sensor device of this invention.

Often the identifier is closely coupled to the transponder. For example, FIG. 2A illustrates typical components of a commercial low-frequency "rice-grain" RFID tag 202. Commercial RFID tag 202 may include a ferrite-rod inductor 204 (an antenna), a resonating capacitor 206, and a silicon microchip 208. The components are conventionally connected together using bonding wire or rigid metal rails. The entire RFID, together with a sensor 214 and a memory component 212, may be encapsulated in glass 210 for environmental protection.

Figure 2B:
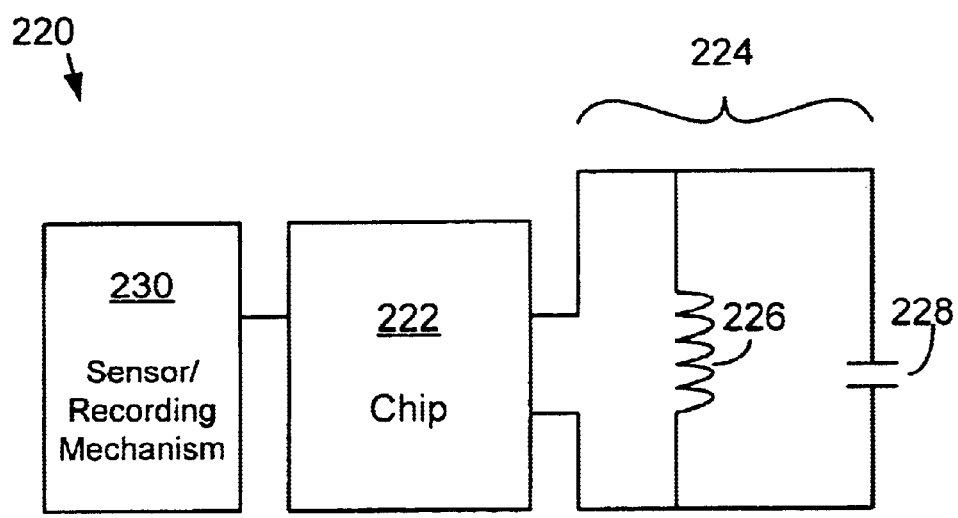
FIG. 2B illustrates a circuit diagram configuration of a low-frequency RFID tag consisting of a microchip and an antenna and used in a recording sensor device of this invention.

FIG. 2B illustrates a circuit diagram configuration of a commercial low-frequency "rice-grain" RFID tag including a microchip 222 and an antenna 224. In this case, an inductor 226 and a capacitor 228 form a parallel-resonant circuit. This circuit produces a maximum output voltage when the frequency of the incident field corresponds to the resonant frequency. The microchip may rectify the incident RF signal when charged to a sufficient voltage and return the identification code residing in its non-volatile memory, stored in microchip 222 in this case, to the remote interrogator using backscatter modulation techniques. In this case, the reader may use a relatively large loop antenna operated in series resonance. This configuration produces maximum current (and hence maximum magnetic field) at resonance, resulting in efficient coupling of energy into the RFID tag. Note that the transponder/identification tag are coupled to sensor/recording mechanism 230. A description of low-frequency RFID operation is provided in "23 mm Glass Encapsulated Transponder Reference Manual" 25 Jul. 1996, published by Texas Instruments Corporation (www.TI.com/mc/docs/tiris/docs/manuals/23mmr.htm) and incorporated herein by reference for all purposes. The described device uses an FM modulator to transpond the data.

Preferably, the device is designed so that device identification information is sent by the transponder regardless of whether the event or state of interest has occurred. This ensures the interrogator that the device is functioning, regardless of what state its recording mechanism is in.

6. Transponder

Generally, a transponder is a device that responds to a stimulus. More specifically, it automatically transmits signals when actuated by a signal from an interrogator. In a common form, it includes an amplifier for increasing the strength of a received incident signal (from the interrogator or other actuating device), a modulator for modifying that signal with information provided to the transponder, and an antenna or antennas for receiving and transmitting. The modulator is that part of the transponder that impresses information on the transmitted signal. A "transceiver" may be a component of a transponder responsible for transmitting and receiving signals, usually independent of one another.

Note that in the example of FIG. 1, rectifier 109, modulator 110 and antenna 117, together act as a transponder. Rectifier 109 and modulator 110 are responsible for communication with interrogator 102 through antenna 117 and contain circuitry capable of carrying out this function. This design is specific to systems employing electromagnetic radiation of an appropriate frequency (e.g., microwave or RF) as the wireless carrier. Other transponder designs are appropriate for other wireless carriers and signals. For example, transponders may be designed for use with acoustic, optical, IR, or electromagnetic sources which are inductively or capacitively coupled. Note that the interrogator (or other probing device) may employ a multi-band or multi-frequency source having one frequency to supply power and a second frequency for interrogation, for example.

Generally, the transponder functions to receive and transmit wireless signals. It receives a wireless probe signal from an interrogator and that signal may include sufficient power to allow its transmission of the device's identifier and recorded state back to the interrogator. It is coupled to the identification tag and the recording mechanism in a manner giving it access to the identifier and recorded state during probing. In general, the interrogation and energizing signals are separate entities In some embodiments, they are provided by the same means for simplification purposes or may include an amplifier to facilitate signal transmission.

7. Examples of Event—and State-recording Devices

Figure 3:
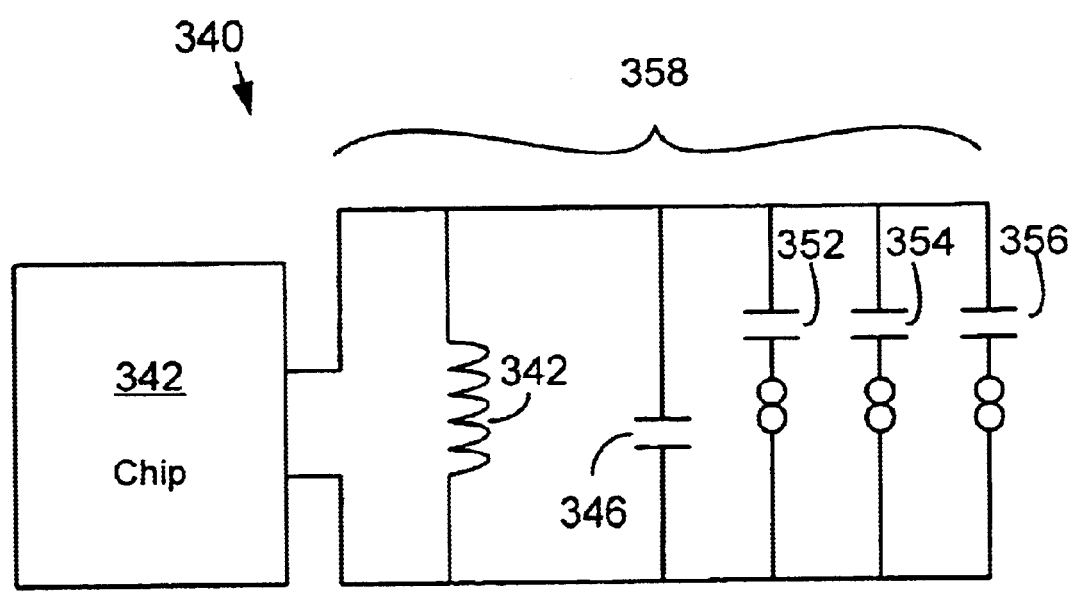
FIG. 3 illustrates an embodiment of the present invention which uses a meltable antenna circuit to unidirectionally record multiple temperature thresholds.

FIG. 3 illustrates one embodiment of the present invention. This embodiment uses a fused antenna circuit 340 to "unidirectionally" record several temperature thresholds. As shown, it includes the identifier and transponder circuitry illustrated in FIGS. 2A and 2B. However, it has been modified to include a number of additional capacitors and fuses in parallel with the existing capacitor. Generally, circuit 340 includes a microchip 342 (which serves as the identification tag) and an antenna circuit 358. In this embodiment, antenna circuit 358 serves as both the recording mechanism and a portion of the transponder. It also includes the sensors (fuses 352, 354, and 356), each provided on a separate leg of the circuit.

Antenna 358 includes an inductor 344 (e.g., a ferrite-loaded inductor), a resonating capacitor 346 and may include the additional capacitors illustrated on the circuit legs of multiple fused sensors 352, 354 and 356. In the depicted embodiment, each additional capacitor may be connected in series to a fuse protected by dielectric encapsulation. The fuse may be designed to melt at a predefined temperature, thereby changing the resonant frequency of the antenna. Capacitance values can be chosen to provide frequency shifts sufficient to dominate over those due to component tolerances and environmental changes. The modified unit may be encapsulated for protection from environment conditions. In this manner, the illustrated embodiment allows unidirectional temperature threshold storage using a meltable antenna circuit which may subsequently be interrogated.

The event-recording device 340 rectifies an incident RF signal coming from an interrogator, such as interrogator 104 of FIG. 1, to provide DC power for the microchip 342. Once the microchip 342 is activated, it modulates the incident carrier with the proper ID code and provides a modulated backscatter signal as mentioned above. A remote receiver reader, which may be coupled to the interrogator, detects this modulated backscattered signal and records the ID information. If the antenna 358 is constructed from regions of metallization connected by thin solder bridges (fuses), then when the solder melts, the resonant frequency of the antenna 358 will shift. The remote receiver looks for the tag response at a specific frequency, and if the frequency has shifted, a temperature over-limit is indicated and recorded for the particular event-recording device.

In addition to connecting the sensor to the RFID in a glass encapsulated enclosure as in FIG. 3, antenna circuit 358 may also be integrated with the silicon microchip in other manners. One example employs glass feedthroughs, where a glass encapsulated integrated circuit (IC) is constructed with feedthrough connections for sensors or actuators (i.e., a microstimulator as used in biological implants).

In general, the event-recording device design of FIG. 3 is not limited to any particular number of sensors. In the simplest case, the device employs only a single sensor (one fuse in this case). Further, the device of FIG. 3 is not limited to temperature threshold sensing. As indicated previously, sensor categories may include, for example, temperature sensors, pressure sensors, flow sensors, stress/strain sensors and accelerometers. In any case the "legs" of this circuit design must be disconnected by discreet physical or chemical events or states. The type of actuation used by the sensor may have to be varied. For example, the fuse type sensors shown in FIG. 3 may be replaced by latch type sensors, microelectromechanical systems, shape memory alloys, and the like.

In another embodiment of the present invention, fuses are incorporated in the microchip, either externally or internally, and may act to change the coded baseband signal directly. This advantageously allows the state change is expressed as a unique code (rather than a subtle change) that can be easily read by the interrogator. However, this approach requires access to the microchip circuit and may necessitate a custom chip design.

In a simple form, the physical or chemical event is recorded by changing a "1" to a "0" or vice versa. The information recorded (whether a single bit or some other information) when the event occurs can be used in two ways. First, it can be used "directly" by appending to the RFID code such that the reader obtains ID data followed by sensor data. Second, it can be used "indirectly" by selecting one of two codes; that is a particular recording device #137 could respond with code #137a if the device is normal and code #137b if the device experienced the event under consideration. From a communication theory point of view, these two codes may be orthogonal or nearly orthogonal so that the reader has a very high probability of distinguishing between a normal device and a transformed device.

In another embodiment, a silicon-based microelectromechanical system (MEMS) may be employed. Such MEMS are seeing increased usage as sensor and actuator systems in a variety of industries. MEMS are small devices integrated onto a microchip that may serve as pressure sensors, accelerometers, strain gauges, electrostatic actuators, microswitches, torsional mirrors, etc. These functions result from various MEMs structures and properties such as capacitance, temperature-dependent semiconductor activity, electrostatics, Hall effect, magnetostriction, piezoelectric effects, piezoresistance effects, etc. For example, a pressure sensor can be implemented in a MEM device in conjunction with a switch. At the over-limit condition, the deflection of a membrane could be used to close a circuit, thus discharging energy or recording the event. Examplary MEMS temperature sensors include infrared detectors and thermocouples.

Another form of sensor applicable for use in a wireless threshold recording device is a shape-memory alloy. These alloys, consisting of nickel-titanium alloys (NiTiNOL) for example, have seen extensive use in aerospace and biomedical applications. Shape-memory alloys have the ability to be deformed easily at low temperatures. At high temperatures, above a well-defined transformation temperature for example, the material returns to its original shape, often exerting a substantial force. This repeatable transition makes these materials suitable for temperature threshold sensors and memory devices. Alternatively, resistive heating may be used to control actuation while transformation temperatures can be flexibly tailored to specific applications by varying the alloy composition.

Figure 4A:
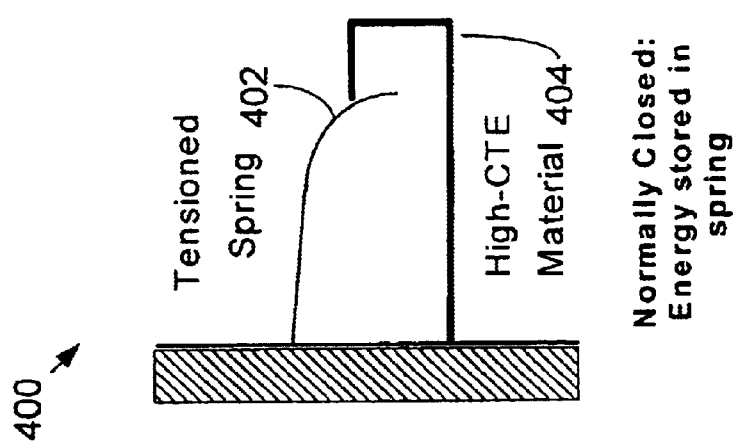
FIG. 4A illustrates a conceptual diagram of an exemplary mechanical latching over-temperature sensor for use in a temperature over-limit application.

FIG. 4A illustrates an exemplary mechanical latching over-temperature sensor 400. The term "latching" may be described as a mechanical or electrical switch that remains in its switched state until reset to its initial state. Latching sensor functions may generally include (1) storing energy, (2) switching when the physical or chemical event occurs, and (3) resetting to an initial state.

For exemplary mechanical latching over-temperature sensor 400, the energy storage is tensioned spring 402, which is released when a high coefficient of thermal expansion (high-CTE) material 404 expands sufficiently to release the tensioned spring 402. In an alternate embodiment, a latching system may be implemented in which the release of tensioned spring 402 is determined by expansion of a gas as a result of differential temperatures. For the mechanical latching over-temperature sensor 400, the connection between the spring 402 and the high-CTE material 404 is normally closed below threshold temperatures. Alternately, it is possible for the connection to be normally open below threshold temperatures (for detecting under-temperature limits for example).

Generally, energy-storage devices may be based on, but not limited to, mechanical (such as a spring or flywheel) devices, electrical (such as a capacitor or CMOS memory cell) devices, magnetic devices, chemical (such as temperature rate-dependent phase changes) devices, gravitational potential, etc. Temperature-sensitive switches can be constructed using shape-memory alloys or bimetallic materials, ferrite devices that change magnetic states when the Curie temperature is exceeded, and various semiconductor effects. The reset function of the latching sensor may be implemented manually (a simple switch), electrically (recharging a capacitor) or with a mechanical actuator such as an electromagnet or piezoelectric device.

Figure 4B:
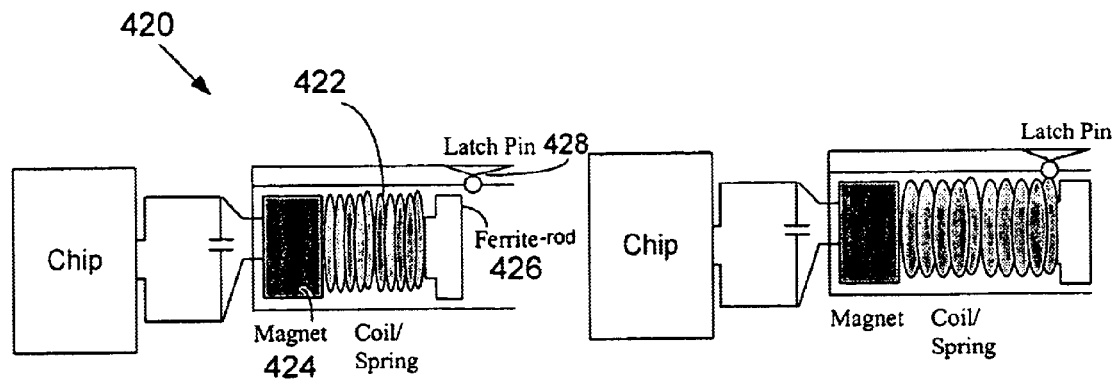
FIG. 4B illustrates an exemplary latching event-recording device of this invention in which the windings of inductor form an antenna that additionally acts as a spring.

FIG. 4B illustrates an exemplary latching event-recording device 420 in which the windings of inductor 422 form an antenna that additionally acts as a spring. A magnet 424 coupled to the inductor 422, acts as the over limit sensor for event-recording device 420. Magnet 424 is demagnetized when the ambient temperature is above the Curie temperature of magnet 424. Subsequently, the force of the coil spring of inductor 422 causes a ferrite-rod 426 and the inductor 422 to expand beyond latch pin 428, thereby changing the inductance of the inductor 422 and consequently shifting the resonant frequency of event-recording device 420.

The event-recording device 420 may also be used as a resetable wireless threshold recording device. In this embodiment, the magnet 424 is designed to have insufficient force to overcome the latch pin 428 when re-magnetized. Event-recording device 420 is then externally reset by applying a suitable DC magnetic field. This may be applied, for example, by an interrogator during subsequent inspection. The inductor 422 acts as an electromagnet and the ferrite rod 426 is forced back toward the magnet 424, passing beyond the latch pin 428. In this manner, event-recording device provides an exemplary case of a unidirectional wireless threshold sensor wherein a resetable sensor passively records an event and the quantity being measured is unable to reset the sensor. Advantageously in this case, space and weight savings are gained by dually implementing the inductor 424 windings that surround the ferrite rod 426 as an antenna and a spring.

In another embodiment, the magnet 424 of event-recording device 420 may be removed and the compressed coil spring could be constructed using a high-temperature (ternary) shape-memory alloy. At an appropriate transformation temperature the shape-memory alloy coil relaxes, forcing the ferrite rod 426 and inductor 422 beyond the latch pin 428. In addition, a second latch pin or stop could be used to prevent over-extension if necessary. Similarly, application of an external DC magnetic field may be used to force the ferrite rod back to its original position, re-compressing the inductor, and resetting the event-recording device.

Figure 4C:
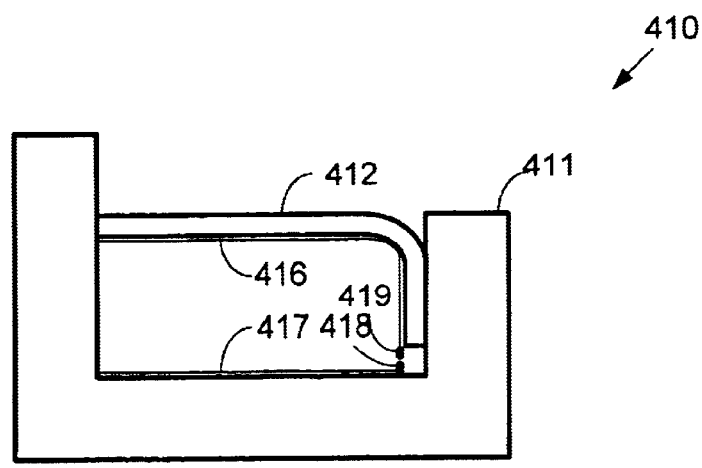
FIG. 4C illustrates an exemplary mechanical latching over-temperature sensor which is normally open.

FIG. 4C illustrates an exemplary mechanical latching over-temperature sensor 400 which is normally open. In this case, a high-CTE material 412 is guided by a housing 411. Upon reaching a threshold temperature, the high-CTE material 412 expands sufficiently to close the contacts 418 and 419. The contacts 418 and 419 each respectively correspond to wires 416 and 417 which provide electrical communication with the remainder of the wireless recording sensor. While a latching mechanism is not illustrated for the sake of simplifying the diagram, such mechanism could assume a number of different forms—including a tooth in housing 411 that engages a notch in material 412.

Certain conventional latching over-limit sensors may be used with this invention. Conventional temperature over-limit latching devices include sensors in smoke alarms and cooking pop-up thermometers. Other latching devices may include an over-stress sensor, a fatigue sensor, and a corrosion sensor. Although conventional forms of these devices are typically too large and unwieldy for many event-recording device applications, the invention is broadly applicable to multiple wireless over-limit sensors in general and may include applications of conventional sensors.

8. Interrogators

An interrogator is used to probe a recording device of this invention. The interrogator provides a wireless probe signal that triggers the sensor device to respond with its identity and the state of its recording mechanism (i.e., whether the physical or chemical event of interest has been detected). In a preferred embodiment, the signal provided by the interrogator also provides the energy necessary for the recording device to reply. The interrogator may be able to detect the reply and present that reply to a computer system or an individual conducting the analysis. Note that devices performing the functions of (1) energizing the event-recording device and (2) communicating with the recording device can be physically separate. They may use different signals for example.

As mentioned above, the wireless interrogation probe may take many different forms such as an RF signal, a microwave signal, a light beam, an electric or magnetic field, etc. The transponder of the recording device must be designed to respond to type of signal provided by the interrogator. While it will often be convenient to design the interrogator and the sensor's transponder to send signals of the same type (e.g., both send RF signals), this is not a requirement of the invention. For example, the interrogator may provide a low-frequency magnetic field as a probe and the transponder may deliver the sensor information via a microwave signal.

Figure 5A:
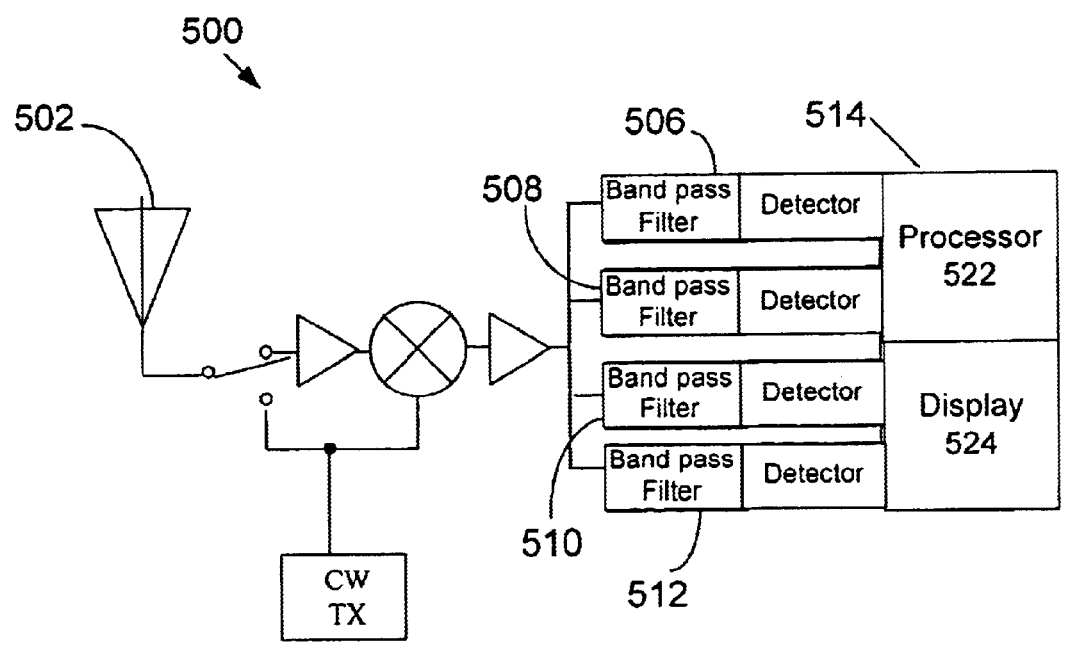
FIG. 5A illustrates, in accordance with one embodiment of the present invention, an exemplary reader block diagram corresponding to an interrogator.

An interrogator provides a probing signal (and power) to a recording sensor device. Preferably the interrogator includes sufficient radiated power to energize the device at the desired read rates, sufficient bandwidth to interrogate the device in a reasonable amount of time, sufficient sensitivity to accurately obtain the device response, sufficient specificity to discriminate between nearby devices (if desired based on the application), a suitable interface to a computer to record and update a database of device history, a suitable size/weight/power limitation, and safety. An interrogator can accomplish the first task by transmitting an electromagnetic (DC, wave or field) or acoustic signal in the form of continuous wave, pulsed cw wave, chirped waveform, spread-spectrum waveform, impulse, or coded waveform to energize the tag. A specific embodiment employs a commercial product such as that supplied by Biomark (Destron) with modification to monitor sensed events. FIG. 5A illustrates, in accordance with one embodiment of the present invention, an exemplary reader block diagram corresponding to an interrogator 500. Interrogator 500 includes an antenna 502 that is capable of receiving the resonant frequency of the event-recording device it is polling. As mentioned in the description of FIG. 3, a passive event-recording device may rectify an incident RF signal coming from interrogator 500 to provide DC power for the microchip 342. Once the microchip is activated, it modulates the incident carrier with the proper ID code and provides a modulated backscatter signal. The response signal may be at a frequency different from that of the incident signal. A remote receiver reader, which may be coupled to the interrogator, detects this modulated backscattered signal and records the ID information. Interrogator 500 may be used in conjunction with RFID event-recording device 220 for example, in which the event-recording device is capable of providing a differential frequency response for varying memory states of the event-recording device 220. In this case, interrogator 500 is capable of receiving at a plurality of resonant frequencies. In addition, interrogator 500 includes a plurality of bandpass filters 506, 508, 510 and 512 as well as detectors 514, 516, 518 and 520 which are coupled to processor 522 and display 524, all of which function to determine what state a probed event-recording device is in.

In another embodiment of the present invention, interrogator 500 is configured to interrogate multiple sensors simultaneously. In this manner, interrogation of a large number of event-recording devices may be advantageously expedited. In a further embodiment of the present invention, the interrogator is non-stationary and may be transported, on a vehicle during interrogation in the TPS case for example, to increase inspection flexibility. Alternately, for the case of TPS inspection, the interrogator may be portably located on or near the RLV. In yet a further embodiment of the present invention, polling may be performed by a remote interrogator, in which interrogation occurs from a substantially larger range, for example as accomplished by using a circularly polarized multiple-windings helix. For the case of TPS inspection, this advantageously may allow interrogation to occur as the RLV enters the hangar, further reducing turnaround time.

A hand-held interrogator may poll multiple devices simultaneously. This is extendable to a mobile platform. It is also possible to use multiple interrogators to speed inspection. These can be used by multiple operators or distributed around the perimeter of hanger entrance, for example.

Figure 5B:
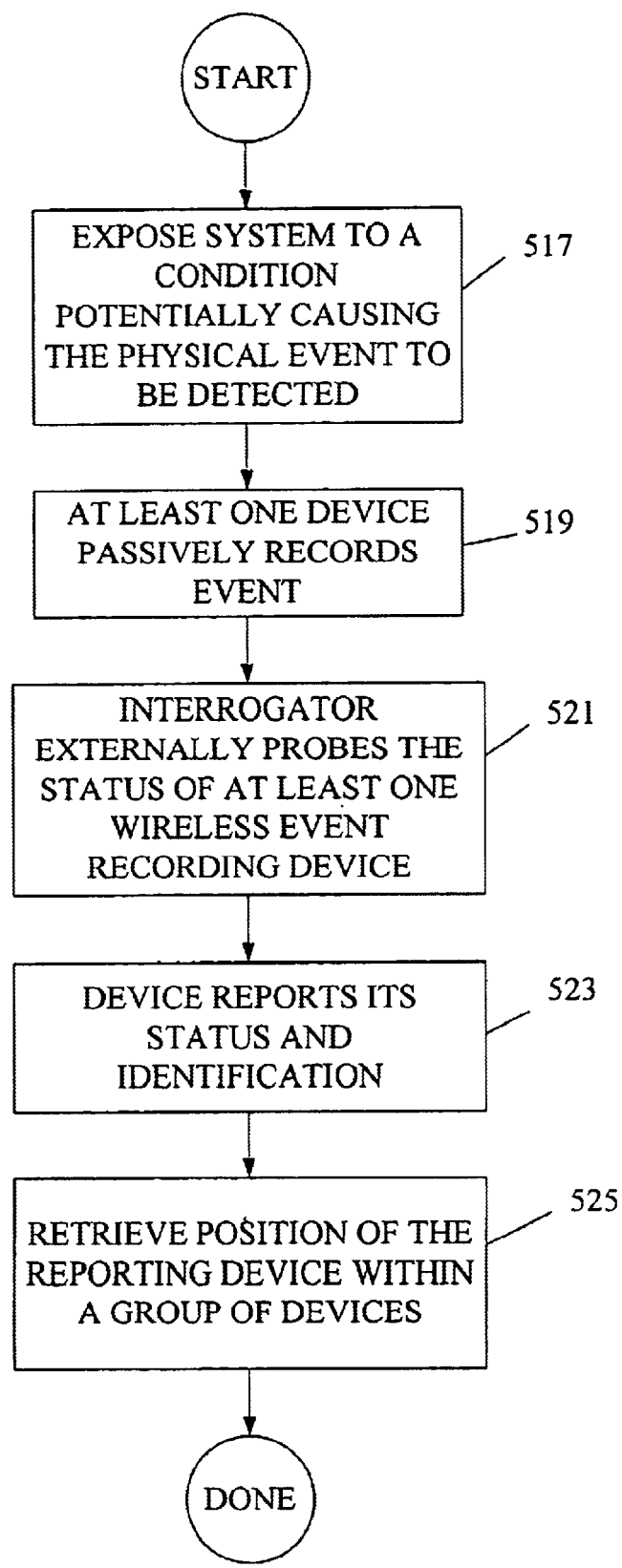
FIG. 5B is a process flow diagram depicting a typical procedure for using the event-recording devices and interrogators of this invention.

The general procedure involved in sensing and interrogation in accordance with this invention is depicted in FIG. 5B. As shown there, the system of interest is first exposed to a condition potentially causing the physical or chemical event to be detected. See 517. If the system is provided with an array of sensors, the condition may be proximate at least one of the recording devices, which detects the physical or chemical event, while other sensors in the array, which are not exposed to the condition, do not detect the event. After a device is exposed to the condition of interest, it passively records the event using its recording mechanism. See 519.

At some later time, an interrogator externally probes the status of at least one wireless event-recording device. See 521. In response, the device reports its status and identification. See 523. The interrogator notes this information for subsequent interpretation.

If the reporting device is one of a group of related devices, the system may retrieve information identifying the spatial or temporal position of the reporting device within the group. See 525. The retrieved information may be provided in a database in which device location is keyed to device identification (ID tag information). Such a database is depicted within a system 530 in FIG. 5C.

Figure 5C:
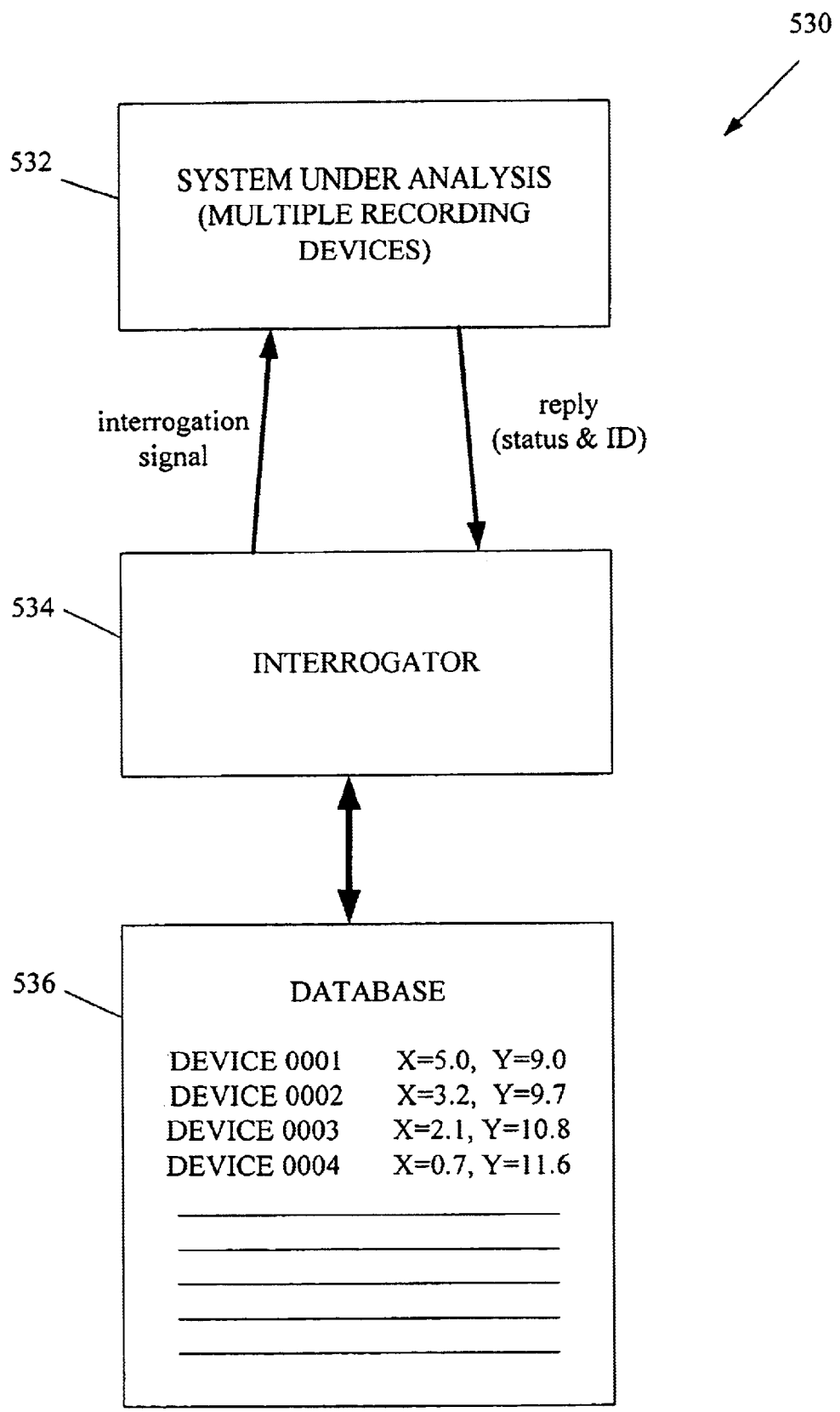
FIG. 5C is a block diagram of a system, including a database of recording device locations, that may be used to implement the present invention.

As shown in FIG. 5C, an interrogator 534 probes one or more event-recording devices 532 (corresponding to 521 in FIG. 5B). At least one event-recording device then replys with its status and ID (corresponding to 523 in FIG. 5C). To determine the location of the responding device, interrogator 534 (or a related system) queries a database 536 containing a list of device IDs and corresponding spatial locations. Database 536 then responds with the location of the device identified in the query. This embodiment is particularly useful when the system includes an array of devices and interrogator must determine which specific device within the array is reporting its status.

Figure 5D:
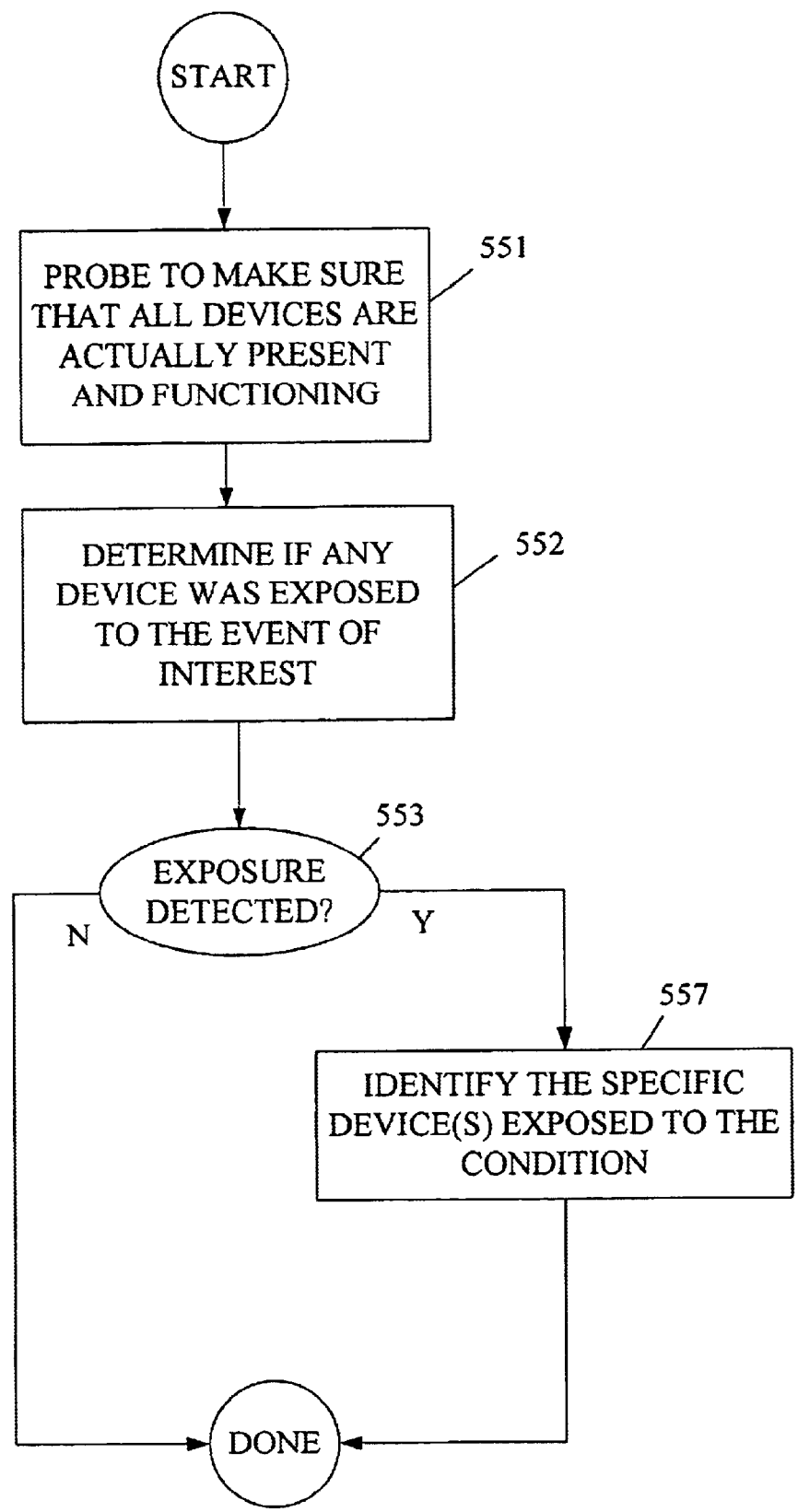
FIG. 5D is a process flow diagram depicting a procedure for rapidly probing an array of event-recording devices in accordance with an embodiment of this invention.

An interrogation process illustrated in FIG. 5D is appropriate for some applications calling for a course inspection of a large structure followed by a fine examination of selected regions. The interrogation process involves a collection of devices (e.g., an array on a large structure with many devices (possibly including DLDs) such as a bridge or RLV). Initially, the structure is probed (551) quickly to make sure that all devices are present and actually functioning. Next, at 552, the interrogator determines if any of the devices was exposed to the event of interest. This procedure may be performed without identifying specific devices in the collection. The interrogating signal may be chosen to identify frequencies that are characteristic of significant events, probing the entire structure (or at least a large region) all at once. The interrogator determines whether a "bad" response was detected at 553. If such a bad response is detected, a more detailed inspection may be needed to determine the location of the device. If not (553 answered in the negative), the process is complete. If the procedure finds that at least one device was exposed to the condition of interest (553 answered in the affirmative), then a more involved interrogation is performed (557) to identify the specific device(s) exposed to the condition.

9. Applications

The present invention finds a wide range of applications. The use of an identification code with each recording device allows for probing large or disparate systems having many spatially or temporally separated points to be probed. A preferred embodiment employs an array of recording devices disposed at various locations in a physical system. Another preferred embodiment employs many separate sensors in discrete items that can be analyzed at different times. For example, a production facility may require that finished items be checked one after another on a production line. Recording devices placed in each of these items are interrogated sequentially to determine whether they meet some condition. Alternately, items may be processed through a checkpoint simultaneously for improved speed and failing items may further be inspected subsequently.

In one specific example, milk cartons or other food containers are provided with recording devices of this invention. The sensors may detect whether the food product has spoiled or has a threshold concentration of bacteria or other contaminant. (More generally, chemical shelf-life may be monitored.) A production mechanism conveys these containers past an interrogator that probes each one separately. Each container responds with its identification code and its state. If the interrogator finds a problem with any of the containers, it can pass the identification of that container to a mechanism downstream that can pull the problem container from the production lot. Alternately, the status of the containers may be checked on the shelf and containers may be removed as necessary.

In another specific example, packages contain an accelerometer that indicates whether they have been dropped or mishandled. At some point in the route of the package (e.g., a mailed package) from a source to a destination, the accelerometer is probed to identify the package and determine whether it has been accelerated past a threshold acceleration. In a specific embodiment, the sensor is implemented as a smart card affixed to the package. The smart card includes a shock sensor which may break a circuit if it experiences over 100 gs of acceleration, for example.

There are many passive event recorders that do not make use of wireless communications/power to monitor subsurface events. Many of these could profit from the wireless event-recording devices/methods of this invention. One example is the X-ray radiation badge to monitor exposure (dosimetry) to ionizing radiation. Typically these badges use film to record the event. After a period of time, the exposed badge and a control badge (for background radiation) are processed (developed) to determine if a hazardous exposure event occurred. Other devices make use of thermoluminescence. Some systems use colorimetry.

In one specific embodiment, an event-recording ID/sensor device uses (when energized) optical methods to determine color change (the event record). In a further specific embodiment, this provides in situ dosimetry measurement with location ID without the need for separate lab processing or imaging systems. In an alternative specific embodiment, the event-recording device monitors exposure by conductivity change and thereby avoids the need for optics altogether.

In a second specific embodiment, the event-recording device is provided in a storage tank to monitor or detect leaking underground storage tanks. Dosimetry technology suitable for such applications, when coupled with the present wireless event-recording sensor/ID invention, is described in Report No. 268: "Application of Passive Dosimetry for Detection of Leaking Underground Storage Tanks" by Francis A. DiGiano, David Leith, Daniel W. Elliott, Bruce Pate, Claudia M. Napfel, and T. Renee Anthony; Department of Environmental Sciences and Engineering, University of North Carolina at Chapel Hill (www2.ncsu.edu/ncsu/wrri/reports/fran.html. This document is incorporated herein by reference for all purposes.

In another application, a collection of event-recording devices are buried or otherwise obscured in trenches alongside new pipeline installations to help in the location of pipe for construction and repair purposes. In one embodiment, the transponder is provided as a diode-loaded-dipole ("DLD" although an RFID tag or other mechanism may be employed). In the case of DLDs, the ID is the resonant frequency; a high quality resonator enables the discrimination of multiple DLDs. An above-ground direction-finding reader illuminates an area where a pipe may be buried. A nonlinear response indicates the presence of the buried pipe. A passive sensor is coupled to a DLD device (or a buried RFID) to indicate that a change in sensor state has occurred. This may be evidenced by a significant resonant frequency shift, for example. This allows for various pipeline diagnostics. Quantities to be sensed include leakage, pH, soil motion, etc.

To generalize, the dipoles could be replaced with other resonant structures such as loops, patches, monopoles, resonant cavities, and the like. The diodes could be replaced with transistors or other non-linear electrical devices.

In one refinement of this embodiment, an RFID device can be used to provide clear identification of a zone that contains multiple DLDs. The DLDs respond with unique IDs (e.g., they could resonate at slightly different frequencies), but there would only be a limited number of combinations. For example, in the case of an RLV, there are about 20,000 tiles, a DLD might respond at 10–100 different frequencies, requiring distribution of RFIDs which distinguish 200–2000 zones. (These numbers are for illustration purposes only.) The DLDs each contain the sensor(s). A family of DLDs is associated with each RFID.

Other applications include corrosion detection (in bridges and aircraft for example) by detecting a threshold change in conductivity (e.g., corrosion of material of interest breaks a circuit connection); water absorption detection (by a hygroscopic material for example) by detecting a change in EMF, conductivity, etc., ion detection (by precipitation of an insoluble species such AgCl for chloride detection) by detecting a change in opacity for example, and the like. Note that for many of these applications, the "event" involves a level of exposure. The device reports how much exposure has occurred. The value of conductivity, opacity, absorption, etc. correlates to the level of exposure. This level can be reported by the event-reporting device.

Figure 6:
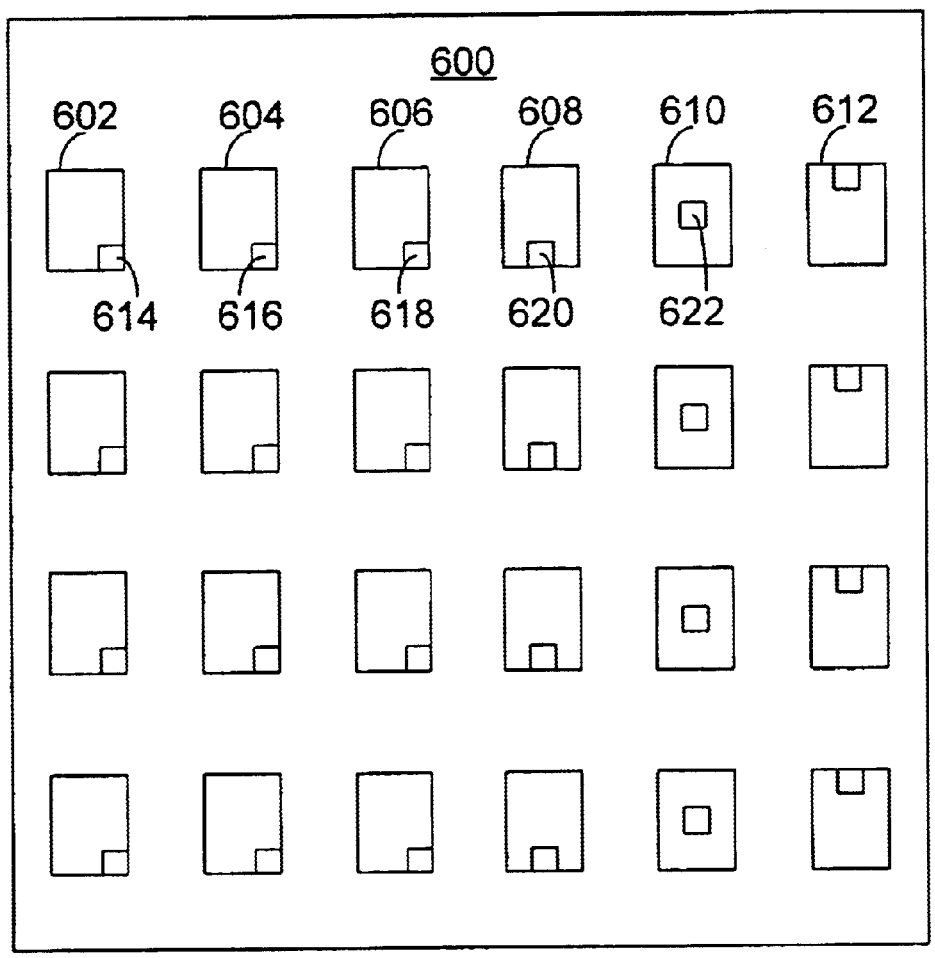
FIG. 6 illustrates a sensor array in accordance with an embodiment of this invention.

FIG. 6 illustrates a block diagram of a sensor array in system 600, in accordance with one embodiment of the invention. The system 600 includes a plurality of individual items 602, 604, 606, 608, 610 and 612 that are being monitored for an event. In this case, each individual item is associated with a single wireless recording device. The wireless recording devices may be associated with the individual items in the same manner as in individual items 602, 604 and 606 and respective wireless recording devices 614, 616 and 618. Alternately, the wireless recording devices may be variably associated with the individual items as in individual items 606, 608 and 610 and respective wireless recording devices 618, 620 and 622.

It should be borne in mind that although one wireless recording device is associated with each individual item of system 600 in this case, it is also possible to associate more than one wireless recording device for each item. Alternately, not each item of system 600 may include a wireless recording device. Further, multiple sensors implemented on a single item may not be identical and may record different events, properties, or have different structures and levels of complexity.

The entire recording device should be designed to withstand the conditions to which it will likely be exposed. Unique environmental conditions may necessitate novel components of the wireless threshold recording device. As indicated above, thermal protection systems of reusable launch vehicles (RLVs) provide one specific application for the wireless threshold recording devices and communication methods of this invention. In the RLV/TPS example, the entire event-recording device components must also be able to operationally withstand these conditions. To this end, Indium-based solders may be employed to withstand the temperature range of interest. Generally, all components of a event-recording device, including those omitted from description herein for brevity's sake, should be capable of surviving environmental conditions greater than the over-limit values they are intended to sense. This implies, in the case of semiconductor devices, that operating/survival temperature may guide the choice of materials to include preferably silicon on insulator (SOI), gallium arsenide, or silicon carbide. Other semiconductor materials (e.g., silicon, germanium, indium phosphide, gallium nitride, ternary compounds, II–VI compounds, etc.) may also be appropriate for certain applications. The recorded ID information of the devices should also survive the radiation environment of space. If needed, EEPROM devices may be constructed on SOI or replaced with PROM devices (fusible links), ferroelectric memory, or other intrinsically radiation-hard devices.

For detection of hot gas penetration, one embodiment is to place wireless threshold recording devices within or attached to individual TPS tiles (e.g., in the gaps between the tiles or at the bondline). This allows recording tile conditions during reentry together with post flight automated interrogation. Advantageously, the repeatability and cost savings the invention for the TPS application is substantial since it eliminates the manual labor involved with individually inspecting each tile. In addition, the remote passive sensing system enables the detection of structural defects that may not be otherwise detected by manual inspection, active sensors, or other conventional monitoring techniques.

The event-recording devices may measure over-temperature conditions, over-stress conditions, the existence of charring, etc. The choice of temperature limits (or other parameter limits) and placement of sensors will depend on material properties, TPS geometry, thermal environment and several other factors. The sensors used in this case may include, for example, a fuse type, a latching type or a circuit-breaker type. The fuse design is for single use in detecting a temperature over-limit and requires repair and insertion of a new sensor if such an over-limit occurs. For a tile-based TPS, it may be desirable to embed each sensor/ID tag combination between the gaps of the ceramic tiles. Alternately, the event-recording devices could be embedded beneath the ceramic tiles, in thermal blanket material, or within the cavities of metal overlapping tiles. As there are an excessive number of tiles on the Space Shuttle, the size, weight, and cost of each event-recording device then becomes important.

In a specific embodiment, RFID tags are used in conjunction with a passive temperature threshold sensor to monitor TPS health. As mentioned, RFID tags are small devices that contain an identification (ID) code which can be read remotely using radio frequency means. For TPS monitoring, the recording device senses and stores a parameter of interest, such as whether the temperature under a tile exceeded a threshold value during reentry, and then reads it out along with the tile's identification code during post-flight inspection. The ID code provides a means of automatically logging the data entry corresponding to the status of each RFID tag and corresponding tile.

In the TPS health monitoring application, each individual event-recording device may be identified as belonging to a unique location or known location relative to a tile. In this application, where 22,000 individual event-recording devices may be implemented, the ID tag may include a 16 bit signal in which the least significant bit is reserved for the status of the memory component and the remaining 15 bits are reserved for identification of the individual event-recording device. In another embodiment, the ID tag includes an 18 bit signal in which the three least significant bits are reserved for identifying the status of multiple thresholds and the remaining 15 bits are reserved for identifying the specific event-recording device.

The TPS of an RLV may be probed by various interrogation systems such as a portal through which the RLV passes, a hand-held interrogator moved about the RLV, a vehicle mounted RLV, and the like. In the case of a portal, an RLV passes through the portal 704 prior to launch. Radio frequency power, transmitted on an RF wave by the portal is used to power the wireless transponders of an individual recording device. Each device may then be individually powered and interrogated as it passes through the portal. This causes each event-recording device to return and its identification code and status to the portal when polled. If at least one sensor has recorded a temperature threshold over-limit, then the RLV may be prevented from flight. At this point, RLV may be detained for detailed inspection or potentially garaged which may include replacement of unhealthy tiles.

Advantageously, an RF interrogation mechanism and passive sensor allow for a wireless threshold recording device that is substantially lighter and smaller than the prior art active communication means or sensor. The large number of tiles on the RLV coupled with the size and weight restrictions of the RLV problem restrict the sensor and communication outside of prior art capabilities. In one embodiment, each event-recording devices may have a mass as low as 9 mg wherein 50,000 devices would weigh approximately 1 lb. Additionally, for the case of automated TPS monitoring, recertification inspection of as many as 50,000 event-recording devices could occur in a matter of hours for the case of a hand held reader, and in a matter of minutes for a portal based interrogator.

10. Conclusion

The versatility, small size and wireless unobtrusive nature of the inventive wireless event-recordingrecording devices allow for sensor application in many interesting applications. Coupling the wireless transponder, the sensor, and the recording mechanism together allows for reduced weight and size. Further, the identification means of the inventive recording devices allow for monitoring of systems where potentially thousands of sensors are implemented and each sensor may be individually monitored.

Another advantage of the invention is that monitoring may flexibly be performed after the event at a more practical or favorable time. As occurrence of the event being monitored may be significantly diverse, such as the case for packages travelling around the world, a monitoring system which may flexibly adapt to event occurrence diversity may allow for significant efficiency improvements in data processing over conventional active sensing. In addition, the ability to flexibly automate the interrogation process allows for rapid and cost efficient inspection alternatives. As described, the invention advantageously hastens the TPS inspection process and may notably reduce operational costs and turnaround time. In addition to the versatility gained in the inventive TPS application, the need for manual inspection and potential damage to the tiles may be eliminated.

While this invention has been described in terms of several preferred embodiments, there are alterations, permutations, and equivalents which fall within the scope of this invention which have been omitted for brevity's sake. It is therefore intended that the scope of the invention should be determined with reference to the appended claims.

What is claimed is:

1. A device for recording a plurality of distinct physical or chemical events or states, the device comprising:
    a combination sensor and recording device, said combination sensor and recording device comprising:
        a sensor for detecting the plurality of physical or chemical events or states wherein the sensor is capable of passively sensing each of the events;
        a recording mechanism, including the sensor, capable of storing records of the plurality of physical or chemical events or states that have been detected by the sensor without using energy received from an interrogator wherein each of the records corresponds to one of the physical or chemical events detected by the sensor and wherein each record is stored using power derived from thermal energy or chemical energy inherently present in an environment where the device is placed and wherein the chemical energy is provided from a chemical reaction between a chemical constituent in the environment and a component of the recording mechanism designed to react with the chemical constituent;
    a tag that contains identification information that can distinguish said device from a plurality of devices;
    a transponder, coupled to the combination sensor and recording device and the tag, configured to transmit a signal indicating one or more of the physical or chemical events or states stored on the recording mechanism and the identification information when triggered by a wireless interrogation signal.

2. The device of claim 1 wherein the transponder is passive.

3. The device of claim 1 wherein the recording mechanism is capable of a plurality of operating states each operating state corresponding to a different event or state detected by the sensor.

4. The device of claim 1 wherein the recording mechanism of is capable of detecting and separately recording a plurality of temperature states or events using power derived from an energy source inherently present in an environment where the device is placed and without using power received from an interrogator and wherein a final operating state of the recording mechanism corresponds to one of the temperature events.

5. The device of claim 1, wherein the recording mechanism and the transponder are provided as a single structure.

6. The device of claim 5, wherein the single structure includes a resonating electrical circuit.

7. The device of claim 1 wherein the recording mechanism is a mechanical structure.

8. The device of claim 7 wherein the mechanical structure is a latching structure.

9. The device of claim 1 wherein the recording mechanism is a microelectomechanical device.

10. The device of claim 1 wherein the recording mechanism is an integrated circuit memory device.

11. The device of claim 1 wherein the recording mechanism is an electrical circuit.

12. The device of claim 1 wherein the wireless interrogation signal is provided on a carrier other than visual light.

13. The device of claim 1 wherein the signal transmitted by the transponder is provided on at least one of an acoustic wave, radio frequency wave, or microwave frequency wave, a light wave, an electric field and a magnetic field.

14. The device of claim 1 wherein a plurality of recording mechanisms or sensors are implemented with each configured to detect or record a different physical or chemical event or state.

15. The device of claim 14 wherein the different physical or chemical events or states are associated with different physical properties.

16. THE device of claim 15 wherein the different physical properties are temperature and strain.

17. The device of claim 14 wherein the different physical or chemical events or states represent different thresholds of a single physical property.

18. The device of claim 17 wherein the different thresholds of the single property represent two substantially different temperature thresholds.

19. The device of claim 1, wherein the sensor is a temperature sensor and the physical or chemical event or state is exceeding a threshold temperature.

20. The device of claim 1, wherein the sensor and the recording mechanism are provided in a single electrical, electromechanical or latching device.

21. The device of claim 1, wherein the transponder includes a modulator and an antenna.

22. The device of claim 1, wherein an operating parameter of the recording mechanism is changed from a first operating state to a second operating state in response to the physical or chemical event detected by the sensor and wherein the recording mechanism can not be spontaneously returned to the first operating state when the physical or chemical event ceases.

23. The device of claim 1, further comprising:
a housing encapsulating said device.

24. The device of claim 23, wherein the housing is adapted to allow the thermal energy or the chemical constituent to be transmitted to the recording mechanism.

25. The device of claim 23, wherein the housing is adapted to allow the device to be embedded in a solid object such that said solid object encapsulates the device.

26. The device of claim 23, wherein the recording sensor is remotely re-settable.

27. The device of claim 1, wherein the recording component is capable of reacting with the chemical constituent in a manner that changes a measurable property of the recording component.

28. An event-recording device for recording a plurality of events associated with a parameter being monitored, said device comprising:
a recording sensor capable of passively sensing the plurality of events wherein a record of each event is stored without using power received from an interrogator by using power derived from thermal energy or chemical energy inherently present in an environment where the event-recording device is placed and wherein to chemical energy is provided from a chemical reaction between a chemical constituent in the environment and a component of the recording sensor designed to react with the chemical constituent; and
a tag that contains identification information that identifies the event-recording device amongst a plurality of event-recording devices,
wherein the event-recording device is capable of reporting one or more of the events detected and recorded by the recording sensor and the identification information using a wireless.

29. The event-recording device of claim 28 wherein the recording sensor is remotely re-setable.

30. The event-recording device of claim 28 further comprising a plurality of recording sensors designed to record separate events.

31. The event-recording device of claim 28 further including more than one recording sensor, wherein each recording sensor is capable of changing from a first state to a second state in response to a separate event, and wherein each recording sensor cannot be further altered from its respective second state solely by the parameter being monitored.

32. A method for recording and reporting events associated with a parameter using a event-recording device having an identification that distinguishes it from a plurality of event-recording devices, the method comprising:
sensing the events using a combination sensor and recording mechanism included in the event-recording device wherein the combination sensor and recording mechanism comprises a recording mechanism, including a sensor, for storing records of a plurality of physical or chemical events or states have been detected by the sensor;
recording each event using power derived from thermal or chemical energy inherently present in an environment where the event-recording device is placed without using power received from an interrogator wherein the chemical energy is provided from a chemical reaction between a chemical constituent in the environment and a component of the event recording device designed to react with the chemical constituent;
externally probing the event-recording device using a wireless interrogator; and
reporting a status of the combination sensor and recording mechanism including information describing one or more of the recorded events and the identification of the individual event-recording device.

33. The method of claim 32 wherein the sensor physically changes from a first state to a second state in response to the event, and where the sensor cannot be further altered from the second state solely by the parameter associated with the event.

34. The method of claim 32 wherein the event is a parameter threshold.

35. The method of claim 32 wherein the combination sensor and recording mechanism provides at least part of an antenna structure for transmitting data to the wireless interrogator.

36. The method of claim 32 wherein the wireless interrogator is an RF probe.

37. The method of claim 32 wherein the status is resonant frequency of a circuit comprising the recording mechanism.

38. A method for recording and reporting events for a system being monitored, the system comprising a plurality of event-recording devices in the system being monitored, each device capable of detecting and passively recording the event using a combination sensor and recording mechanism, the method comprising:
exposing the system to a condition potentially causing the events proximate at least one of the event-recording devices;
sensing the events using a combination sensor and recording mechanism included in the event-recording device wherein the combination sensor and recording mechanism comprises a recording mechanism, including at least one sensor, for storing records of a plurality of the events that have been detected by the sensor;
recording each event using power derived from thermal energy or chemical energy inherently present in an environment where the event-recording device is placed without using power received from an interrogator wherein the chemical energy is provided from a chemical reaction between a chemical constituent in the environment and a component of the event recording device designed to react with the chemical constituent;

externally probing the status of at least one event-recording device with a wireless interrogator after the event has been recorded by the recording mechanism; and reporting the status and identification of the at least one event-recording device using wireless means.

39. The method of claim 38 wherein the physical or chemical event or state is a one of a temperature event or a temperature state.

40. The method of claim 38 wherein the plurality of event-recording devices are mounted at separate locations on a single structure.

41. A collection of sensors for providing information about a system said collection comprising:

a plurality of spatially separated event-recording devices each being distinguishable from the remaining event-recording devices of the collection when probed by an interrogation signal, each event-recording device comprising:

a combination sensor and recording device, said combination sensor and recording device comprising:

a sensor for detecting a plurality of physical or chemical events or states;

a recording mechanism, including the sensor, capable of storing records of the plurality of physical or chemical events or states that have been detected by the sensor without using energy received from an interrogator wherein each of the records corresponds to one of the physical or chemical events detected by the sensor and wherein each record is stored using power derived from thermal energy or chemical energy inherently present in an environment where the device is placed and wherein the chemical energy is provided from a chemical reaction between a chemical constituent in the environment and a component of the recording mechanism designed to react with the chemical constituent;

a transponder, coupled to the recording mechanism and configured to transmit a wireless signal for indicating information that has been recorded about one or more events when triggered by the interrogation signal.

42. The collection of claim 41 wherein the wherein the combination sensor and recording device of is capable of detecting a plurality of temperature states or events and wherein a final operating state of the recording mechanism corresponds to one of the temperature events.

43. The collection of claim 41 wherein at least one of the event-recording devices includes a plurality of the combination sensor and recording mechanism devices or sensors, each configured to detect or record a different physical or chemical event or state.

44. The collection of claim 41 wherein the plurality of event-recording devices are mounted at separate locations on a single structure.

45. An event sensing apparatus for recording and reporting events for a parameter in a system being monitored, said apparatus comprising:

one or more event-recording devices in the system being monitored, each event-recording device capable of detecting the events and including i) a combination sensor and recording mechanism a sensor for detecting a plurality of physical or chemical events or states;

a recording mechanism including the sensor, capable of storing records of the plurality of physical or chemical events or states that have been detected by the sensor without using energy received from an interrogator wherein each of the records corresponds to one of the physical or chemical events detected by the sensor and wherein each record is stored using power derived from thermal energy or chemical energy inherently present in an environment where the device is placed and wherein the chemical energy is provided from a chemical reaction between a chemical constituent in the environment and a component of the recording mechanism designed to react with the chemical constituent;

ii) an identification tag containing information which identifies the event-recording device frosts a plurality of event-recording devices, and iii) a passive transponder coupled to the recording mechanism and the identification tag; and iv) an interrogator for wirelessly probing the status of at least one event-recording device subsequent to the event, wherein the interrogator powers the transponder of the event-recording device and receives information on the state of the combination sensor and recording device and the identification tag.

46. The apparatus of claim 45 further comprising a database providing records identifying the locations of multiple event-recording devices.

47. A device for reporting one or more physical or chemical events or states, the device comprising:

a combination sensor and recording device, said combination sensor and recording device comprising;

at least one sensor for detecting the one or more physical or chemical events or states;

a recording mechanism, including the sensor, capable of storing records of the plurality of physical or chemical events or states that have been detected by the sensor without using energy received from an interrogator wherein each of the records corresponds to one of the physical or chemical events detected by the sensor and wherein each record is stored using power derived from thermal energy or chemical energy inherently present in an environment where the device is placed and wherein the chemical energy is provided from a chemical reaction between a chemical constituent in the environment and a component of the recording mechanism designed to react with the chemical constituent and wherein the combination sensor and recording device is remotely re-settable;

a tag that contains identification information that can distinguish said device from a plurality of devices;

a transponder, coupled to the combination sensor and recording device and the tag, configured to transmit a signal indicating information about one or more of the physical or chemical events or states stored on the recording mechanism and the identification information when triggered by a wireless interrogation signal; and a housing encapsulating the combination sensor and recording device, the tag, and the transponder.

48. The combination sensor and recording device of claim 47, wherein the events are temperature events.

49. The combination sensor and recording device of claim 47, further comprising a plurality of sensors.

50. The combination sensor and recording device of claim 47, wherein an operating parameter of the recording mechanism is changed from a first operating state to a second operating state in response to the physical or chemical event detected by the sensor and wherein the recording mechanism can not be spontaneously returned to the first operating state when the physical or chemical event ceases.

51. A device for reporting one or more physical or chemical events or states, the device comprising:
- a combination sensor and recording device, said combination sensor and recording device comprising;
  - at least one sensor for detecting the one or more physical or chemical events or states;
  - a recording mechanism, including the sensor, for storing a record of each of the one or more physical or chemical events or states has that have been detected by the sensor wherein each of the records corresponds to one of the physical or chemical events detected by the at least one sensor and wherein each record is stored using power derived from a thermal energy source inherently present in an environment where the event-recording device is placed and without using power received from an interrogator;
- a tag that contains identification information that can distinguish said device from a plurality of devices;
- a transponder, coupled to the combination sensor and recording device and the tag, configured to transmit a signal indicating information about one or more of the physical or chemical events or states stored on the recording mechanism and the identification information when triggered by a wireless interrogation signal; and
- a housing encapsulating the combination sensor and recording device, the tag, and the transponder.

52. The device of claim 51, wherein the combination sensor and recording device is remotely re-settable.

53. The device of claim 51, wherein the thermal energy source is used to perform work on a gas or fluid contained in the recording mechanism.

54. A device for reporting one or more physical or chemical events or states, the device comprising:
- a combination sensor and recording device, said combination sensor and recording device comprising;
  - at least one sensor for detecting the one or more physical or chemical events or states;
  - a recording mechanism, including the sensor, capable of storing records of the plurality of physical or chemical events or states that have been detected by the sensor without using energy received from an interrogator wherein each of the records corresponds to one of the physical or chemical events detected by the sensor and wherein each record is stored using power derived from thermal energy or chemical energy inherently present in an environment where the device is placed and wherein the chemical energy is provided from a chemical reaction between a chemical constituent in the environment and a component of the recording mechanism designed to react with the chemical constituent;
- a tag that contains identification information that can distinguish said device from a plurality of devices;
- a transponder, coupled to the combination sensor and recording device and the tag, configured to transmit a signal indicating information about one or more of the physical or chemical events or states stored on the recording mechanism and the identification information when triggered by a wireless interrogation signal; and
- a housing encapsulating the combination sensor and recording device, the tag, and the transponder.

55. The device of claim 54, wherein the combination sensor and recording device is remotely re-settable.

56. The device of claim 54, wherein the recording component is capable of reacting with the chemical constituent in a manner that changes a measurable property of the recording component.

* * * * *